United States Patent
Marshall et al.

(10) Patent No.: US 10,725,515 B2
(45) Date of Patent: Jul. 28, 2020

(54) INDUCTIVE INTERCONNECTION SYSTEM

(71) Applicant: Apple Inc., Cupertino, CA (US)

(72) Inventors: Blake R. Marshall, San Jose, CA (US); Florence W. Ow, Los Altos Hills, CA (US); Joel N. Ruscher, Fremont, CA (US); Liquan Tan, Sunnyvale, CA (US); Aidan N. Zimmerman, Sunnyvale, CA (US); Reza Nasiri Mahalati, Belmont, CA (US); Hao Zhu, San Jose, CA (US); Qigen Ji, Fairfield, CA (US); Madhusudanan Keezhveedi Sampath, San Jose, CA (US); Nan Liu, Sunnyvale, CA (US); Robert Scritzky, Sunnyvale, CA (US); Gianpaolo Lisi, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/127,046

(22) Filed: Sep. 10, 2018

(65) Prior Publication Data

US 2019/0103764 A1     Apr. 4, 2019

Related U.S. Application Data

(60) Provisional application No. 62/565,460, filed on Sep. 29, 2017, provisional application No. 62/565,471, filed on Sep. 29, 2017.

(51) Int. Cl.
*H01F 7/14*     (2006.01)
*G06F 1/26*     (2006.01)
(Continued)

(52) U.S. Cl.
CPC ............ *G06F 1/266* (2013.01); *G06F 1/1626* (2013.01); *G06F 1/1635* (2013.01);
(Continued)

(58) Field of Classification Search
CPC ............ H01F 2005/027; H01F 27/365; H01F 17/045; H01F 37/14; H01F 2003/005;
(Continued)

(56) References Cited

U.S. PATENT DOCUMENTS 7,038,565 B1   5/2006 Chell
7,808,348 B2   10/2010 Fullerton et al.
(Continued)

FOREIGN PATENT DOCUMENTS

AU   2018101452   10/2018
AU   2018101453   10/2018
(Continued)

OTHER PUBLICATIONS

Australia Patent Application No. 2018101452, First Examination Report, dated Dec. 20, 2018, 7 pages.
(Continued)

*Primary Examiner* — Mang Tin Bik Lian
(74) *Attorney, Agent, or Firm* — Kilpatrick Townsend & Stockton LLP

(57) ABSTRACT

Embodiments describe a receiving element that includes a ferromagnetic structure axially symmetrical around a central axis disposed along a length of the ferromagnetic structure. The ferromagnetic structure includes a groove region defining two end regions on opposing sides of the groove region, where the groove region has a smaller length than the two end regions. The receiving element also includes an inductor coil wound about the groove region of the ferromagnetic structure and in between the two end regions.

20 Claims, 17 Drawing Sheets

(51) Int. Cl.
| | | |
|---|---|---|
| *H02J 50/10* | (2016.01) | |
| *H02J 7/02* | (2016.01) | |
| *G06F 3/038* | (2013.01) | |
| *H01F 27/36* | (2006.01) | |
| *H02J 50/90* | (2016.01) | |
| *G06F 3/0354* | (2013.01) | |
| *H01F 38/14* | (2006.01) | |
| *H01F 7/02* | (2006.01) | |
| *G06F 1/16* | (2006.01) | |

(52) U.S. Cl.
CPC .......... *G06F 1/1637* (2013.01); *G06F 1/1656* (2013.01); *G06F 3/0383* (2013.01); *G06F 3/03545* (2013.01); *H01F 7/0252* (2013.01); *H01F 27/362* (2013.01); *H01F 27/365* (2013.01); *H01F 38/14* (2013.01); *H02J 7/025* (2013.01); *H02J 50/10* (2016.02); *H02J 50/90* (2016.02); *G06F 3/038* (2013.01)

(58) Field of Classification Search
CPC . H02J 50/10; H02J 50/90; H02J 7/025; G06F 1/266; G06F 3/0383; G06F 3/03545; G06F 3/03542; G06F 3/0386
USPC ........... 336/212, 90, 200; 307/104; 320/108, 320/109; 345/173, 179; 726/34
See application file for complete search history.

(56) References Cited

U.S. PATENT DOCUMENTS

| | | | |
|---|---|---|---|
| 8,947,047 B2 | 2/2015 | Partovi et al. | |
| 9,507,381 B1 | 11/2016 | Vanderet et al. | |
| 9,614,378 B2 | 4/2017 | Golko et al. | |
| 9,722,433 B2 | 8/2017 | Ichikawa et al. | |
| 9,748,791 B2 | 8/2017 | Lee et al. | |
| 9,884,563 B2 * | 2/2018 | Yuasa | H01F 38/14 |
| 2005/0068019 A1 | 3/2005 | Nakamura et al. | |
| 2008/0186683 A1 | 8/2008 | Ligtenberg et al. | |
| 2013/0214887 A1 | 8/2013 | Lauder et al. | |
| 2013/0241897 A1 * | 9/2013 | Fukushima | G06F 3/046 345/179 |
| 2013/0249479 A1 | 9/2013 | Partovi | |
| 2013/0300204 A1 | 11/2013 | Partovi | |
| 2014/0008995 A1 | 1/2014 | Kanno | |
| 2014/0327391 A1 * | 11/2014 | Niederhauser | B60L 11/182 320/108 |
| 2015/0069833 A1 * | 3/2015 | Yuasa | B60L 53/38 307/10.1 |
| 2015/0091388 A1 | 4/2015 | Golko et al. | |
| 2015/0127069 A1 * | 5/2015 | Dearden | A61N 1/36125 607/61 |
| 2015/0244181 A1 * | 8/2015 | Kagami | H01F 27/36 307/104 |
| 2015/0277592 A1 | 10/2015 | Nishigaki | |
| 2015/0325352 A1 | 11/2015 | Lowe | |
| 2015/0380154 A1 * | 12/2015 | Kagami | H01F 27/2823 336/220 |
| 2016/0005519 A1 | 1/2016 | Choi | |
| 2016/0056664 A1 | 2/2016 | Partovi | |
| 2016/0094078 A1 | 3/2016 | Graham et al. | |
| 2016/0162049 A1 * | 6/2016 | Horie | G06F 3/03545 345/179 |
| 2016/0260532 A1 | 9/2016 | Baca | |
| 2017/0093454 A1 | 3/2017 | Chawan et al. | |
| 2017/0248999 A1 | 8/2017 | Ng et al. | |
| 2017/0250578 A1 | 8/2017 | Kallman et al. | |
| 2018/0040417 A1 * | 2/2018 | Krupezevic | H02J 50/10 |

FOREIGN PATENT DOCUMENTS

| | | |
|---|---|---|
| CN | 104868569 | 8/2015 |
| CN | 105190800 | 12/2015 |
| CN | 105958659 | 9/2016 |
| CN | 106169816 | 11/2016 |
| CN | 106655353 | 5/2017 |
| JP | 07221825 | 8/1995 |
| JP | 2009290926 | 12/2009 |
| JP | 2012204469 | 10/2012 |
| JP | 2015195635 | 11/2015 |
| JP | 2015202038 | 11/2015 |
| JP | 2016001692 | 1/2016 |
| JP | 2016507841 | 3/2016 |
| TW | 201444195 | 11/2014 |
| TW | 201711335 | 3/2017 |
| TW | 1596628 | 8/2017 |
| WO | 2009105615 | 8/2009 |
| WO | 2014006895 | 1/2014 |
| WO | 2015148489 | 10/2015 |
| WO | 2017040755 | 3/2017 |

OTHER PUBLICATIONS

Australia Patent Application No. 2018101453, First Examination Report, dated Dec. 7, 2018, 5 pages.
European Patent Application No. 18196865.2, Extended European Search Report, dated Oct. 31, 2018, 9 pages.
European Patent Application No. 18196885.0, Extended European Search Report, dated Oct. 31, 2018, 9 pages.
Australian Patent Application No. 2019100513 , "First Examination Report", dated Jul. 10, 2019, 7 pages.
Japan Patent Application No. 2018-178021 , "Office Action", dated Aug. 30, 2019, 4 pages.
Japan Patent Application No. 2018-178024 , "Office Action", dated Aug. 2, 2019, 5 pages.
Taiwan Patent Application No. 107134034 , "Office Action", dated Jul. 3, 2019, 15 pages.
Taiwan Patent Application No. 107134035 , "Office Action", dated Jul. 3, 2019, 7 pages.
Taiwan Patent Application No. 107134034, Office Action, dated Nov. 13, 2019, 16 pages.
European Patent Application No. 18196885.0, Office Action, dated Feb. 11, 2020, 5 pages.

\* cited by examiner

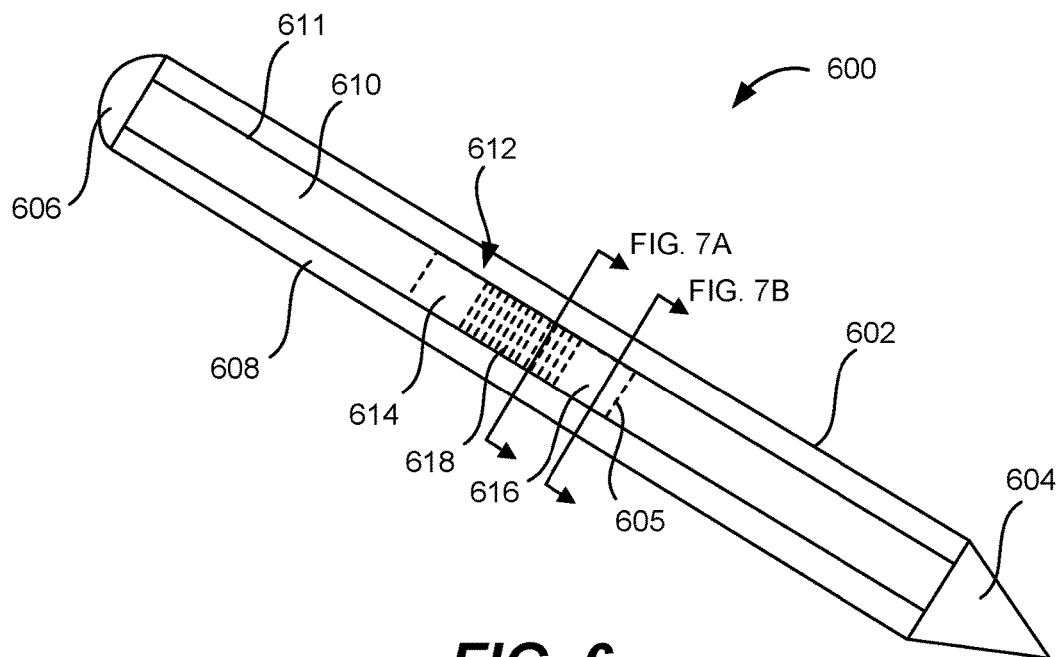
FIG. 6
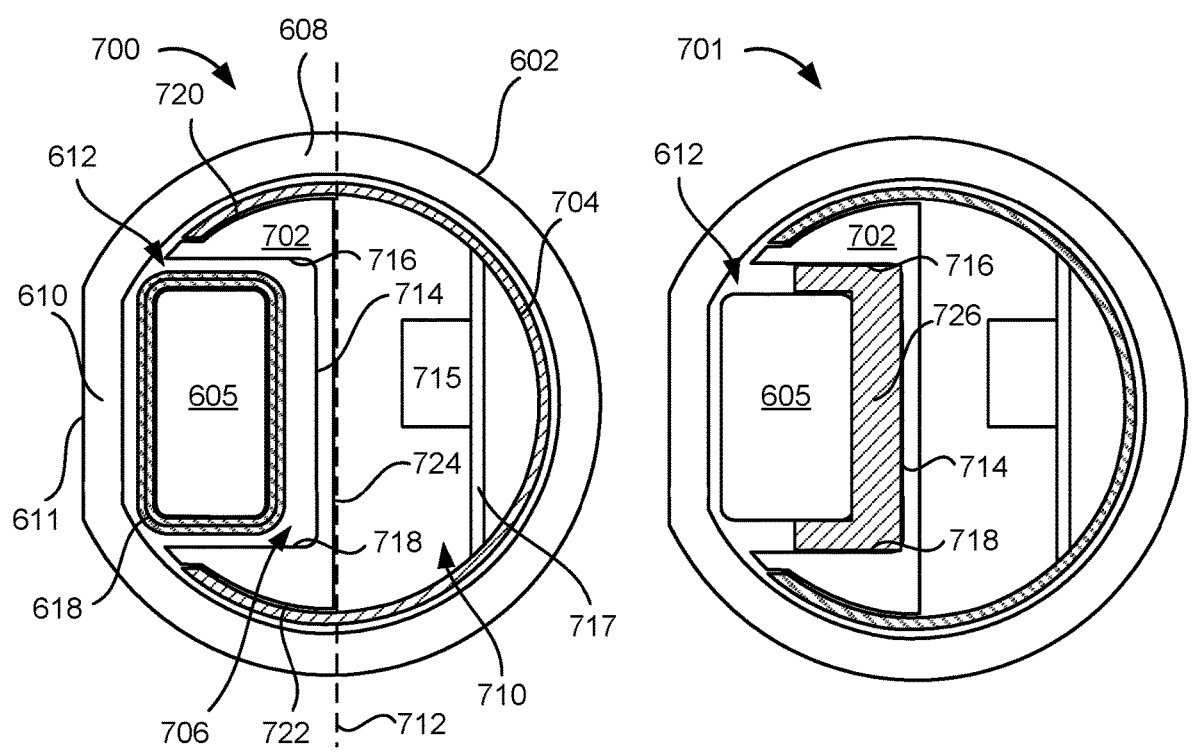
FIG. 7A     FIG. 7B

INDUCTIVE INTERCONNECTION SYSTEM

CROSS REFERENCES TO RELATED APPLICATIONS

This application claims priority to U.S. Provisional Patent Application No. 62/565,460, filed on Sep. 29, 2017 and U.S. Provisional Patent Application No. 62/565,471, filed on Sep. 29, 2017, and is related to the concurrently filed and commonly assigned U.S. Non-Provisional patent application Ser. No. 16/127,072, filed Sep. 10, 2018, entitled "Attachment Devices for Inductive Interconnection Systems", the disclosures of which are herein incorporated by reference in their entirety and for all purposes.

BACKGROUND

Portable electronic devices, such as tablets, smart phones, and the like, have become ubiquitous in modern day life. The functionality and utility provided by these portable electronic devices enhance the life of a user by simplifying tasks, improving productivity, and providing entertainment. Some portable devices, however, are difficult to interact with because several input methods are simply not provided. For instance, the small form factor of some portable electronic devices result in devices that do not have a physical keyboard, making typing cumbersome. Additionally, portable electronic devices have a display screen which is not a suitable surface on which the user can write with a typical writing utensil, e.g., a pen or pencil.

Accordingly, accessory devices have been developed to complement the use of these portable electronic devices to enhance user experience by filling in these gaps in usability. For instance, portable keyboards have been developed to connect with these portable electronic devices to provide a physical keyboard on which a user can type by pressing keys. Furthermore, electronic writing devices, e.g., styluses, smart pencils, and the like, have been designed to act as a writing utensil for these portable electronic devices.

In some cases, these accessory devices operate by utilizing power from a host device, such as the portable electronic device. The power from the host device can be provided to the accessory devices during use or at an earlier time when the accessory devices are storing power in one or more locally stored batteries only to be used at a later time. Often, these accessory devices couple to the host device through one or more exposed electrical contacts. Using exposed electrical contacts to charge a battery in an accessory device, however, requires the host device and accessory device to have exposed electrical contacts. The exposed contacts can be formed of a plug-and-socket type connection mechanism that results in one or more openings in both the host and accessory devices. This can provide an avenue within which dust and moisture can intrude and damage the devices. Furthermore, the plug-and-socket type of connections require the host and accessory device to be physically connected together, thereby limiting the ease at which the accessory device can be charged by the host device.

SUMMARY

Some embodiments of the disclosure provide an inductive interconnection system that enables wireless power transfer between a host device and an accessory device. The inductive interconnection system enables the accessory device to receive power from the host device in various rotational orientations. This eases the way in which the accessory device can receive power from the host device.

In some embodiments, a receiving element includes a ferromagnetic structure having a groove region defining two end regions on opposing sides of the groove region, where each end region including respective interface surfaces, and the groove region has a smaller length than the two end regions. The receiving element can further include an inductor coil wound about the groove region of the ferromagnetic structure and in between the two end regions, where the length of the groove region is a dimension that extends along a direction perpendicular to the axis of the inductor coil. The receiving element can also include a shield comprising a plurality of sidewalls and a back wall that form a cavity within which the ferromagnetic structure and inductor coil are positioned, and a spacer positioned between the ferromagnetic structure and the shield to attach the ferromagnetic structure to the shield.

In some additional embodiments, an inductive interconnection system includes a transmitting element and a receiving element. The transmitting element includes a transmitting ferromagnetic structure having a transmitting groove region defining two transmitting end regions disposed on opposing sides of the transmitting groove region, and a transmitting inductor coil wound about the transmitting groove region of the transmitting ferromagnetic structure and in between the two transmitting end regions, the transmitting inductor coil configured to generate time-varying magnetic flux through the transmitting ferromagnetic structure. The receiving element can include a ferromagnetic structure having a groove region defining two end regions on opposing sides of the groove region, each end region comprising respective interface surfaces, wherein the groove region has a smaller length than the two end regions. The receiving element can further include an inductor coil wound about the groove region of the ferromagnetic structure and in between the two end regions, a shield comprising a plurality of sidewalls and a back wall that form a cavity within which the ferromagnetic structure and inductor coil are positioned, and a spacer positioned between the ferromagnetic structure and the shield to attach the ferromagnetic structure to the shield.

In certain embodiments, a stylus for inputting data into a host device includes a housing comprising a curved portion and a flat portion, power receiving circuitry disposed within the housing, a receiving element disposed within the housing and coupled to the power receiving circuitry, and an operating system coupled to the power receiving circuitry and the receiving element, and configured to operate the power receiving circuitry and the receiving element to receive power from the host device. The receiving element includes a ferromagnetic structure having a groove region defining two end regions on opposing sides of the groove region, where each end region includes respective interface surfaces, and the groove region has a smaller length than the two end regions. The receiving element can further include an inductor coil wound about the groove region of the ferromagnetic structure and in between the two end regions, where the length of the groove region is a dimension that extends along a direction perpendicular to the axis of the inductor coil. The receiving element can also include a shield comprising a plurality of sidewalls and a back wall that form a cavity within which the ferromagnetic structure and inductor coil are positioned, and a spacer positioned between the ferromagnetic structure and the shield to attach the ferromagnetic structure to the shield.

In some embodiments, an alignment device includes a center magnet having poles arranged in a vertical orientation, first and second strengthening magnets disposed on opposite ends of the center magnet, where the first and second strengthening magnets having poles arranged in a horizontal orientation, and first and second ferromagnetic structures disposed on outer ends of corresponding first and second strengthening magnets such that the first strengthening magnet is disposed between the first ferromagnetic structure and the center magnet, and the second strengthening magnet is disposed between the second ferromagnetic structure and the center magnet.

In some additional embodiments, an alignment device including a center ferromagnetic structure; first and second magnets disposed on opposite ends of the center ferromagnetic structure, the first and second magnets having polar ends that are arranged in a horizontal orientation, and first and second side ferromagnetic structures disposed on ends of the first and second magnets such that the first magnet is disposed between the first side ferromagnetic structure and the center ferromagnetic structure, and the second magnet is disposed between the second side ferromagnetic structure and the center ferromagnetic structure.

In certain embodiments, a portable electronic device includes a housing, a battery disposed within the housing, a display disposed within the housing and configured to perform user interface functions, a processor disposed within the housing and coupled to the display and configured to command the display to perform the user interface functions, a transmitting element disposed within the housing, and power transmitting circuitry coupled to the processor and the battery, wherein the power transmitting circuitry is configured to route power from the battery to the transmitting element. The transmitting element includes a center magnet having poles arranged in a vertical orientation, first and second strengthening magnets disposed on opposite ends of the center magnet, the first and second strengthening magnets having poles arranged in a horizontal orientation, and first and second ferromagnetic structures disposed on outer ends of corresponding first and second strengthening magnets such that the first strengthening magnet is disposed between the first ferromagnetic structure and the center magnet, and the second strengthening magnet is disposed between the second ferromagnetic structure and the center magnet.

A better understanding of the nature and advantages of embodiments of the present invention may be gained with reference to the following detailed description and the accompanying drawings.

BRIEF DESCRIPTION OF THE DRAWINGS

FIG. 6 is a simplified perspective view diagram of an exemplary accessory device, according to some embodiments of the present disclosure.

FIG. 7A is a simplified cross-sectional diagram of an accessory device at a point across a receiver coil of a receiver element, according to some embodiments of the present disclosure.

FIG. 7B is a simplified cross-sectional diagram of accessory device at a point across an interface surface of a receiver element, according to some embodiments of the present disclosure.

DETAILED DESCRIPTION OF THE INVENTION

Embodiments of the disclosure describe an inductive interconnection system for a wireless charging system that enables wireless power transfer between a host device and an accessory device. The inductive interconnection system can include a transmitting element and a receiving element configured to receive wireless power from the transmitting element. The transmitting element can be housed within the host device, and the receiving element can be housed within the accessory device so that the accessory device can receive power from the host device. In some embodiments, the transmitting and receiving elements each include a ferromagnetic structure and an inductive coil wound about at least a portion of the ferromagnetic structure. During wireless power transfer, the transmitting element can generate time-varying magnetic flux that can induce a corresponding current in the receiving element to charge the accessory device. The configuration of the transmitting and receiving elements can enable the accessory device to receive power from the host device in various rotational orientations, as will be discussed in further detail herein. Accordingly, the inductive interconnection system significantly improves the ease at which the accessory device can receiver power from the host device.

I. Wireless Charging System

A wireless charging system includes an electronic transmitting device that transmits power and an electronic receiving device that receives power from the electronic transmitting device. According to some disclosures herein, the electronic transmitting device can be a host device, e.g., a tablet, smart hone, and any other portable consumer electronic device, that is capable of performing various functions for a user; and, the electronic receiving device can be an accessory device, e.g., a portable keyboard, stylus, smart pencil, wireless earphones, and any other suitable electronic device, that can enhance the function of the host device.

Figure 1:
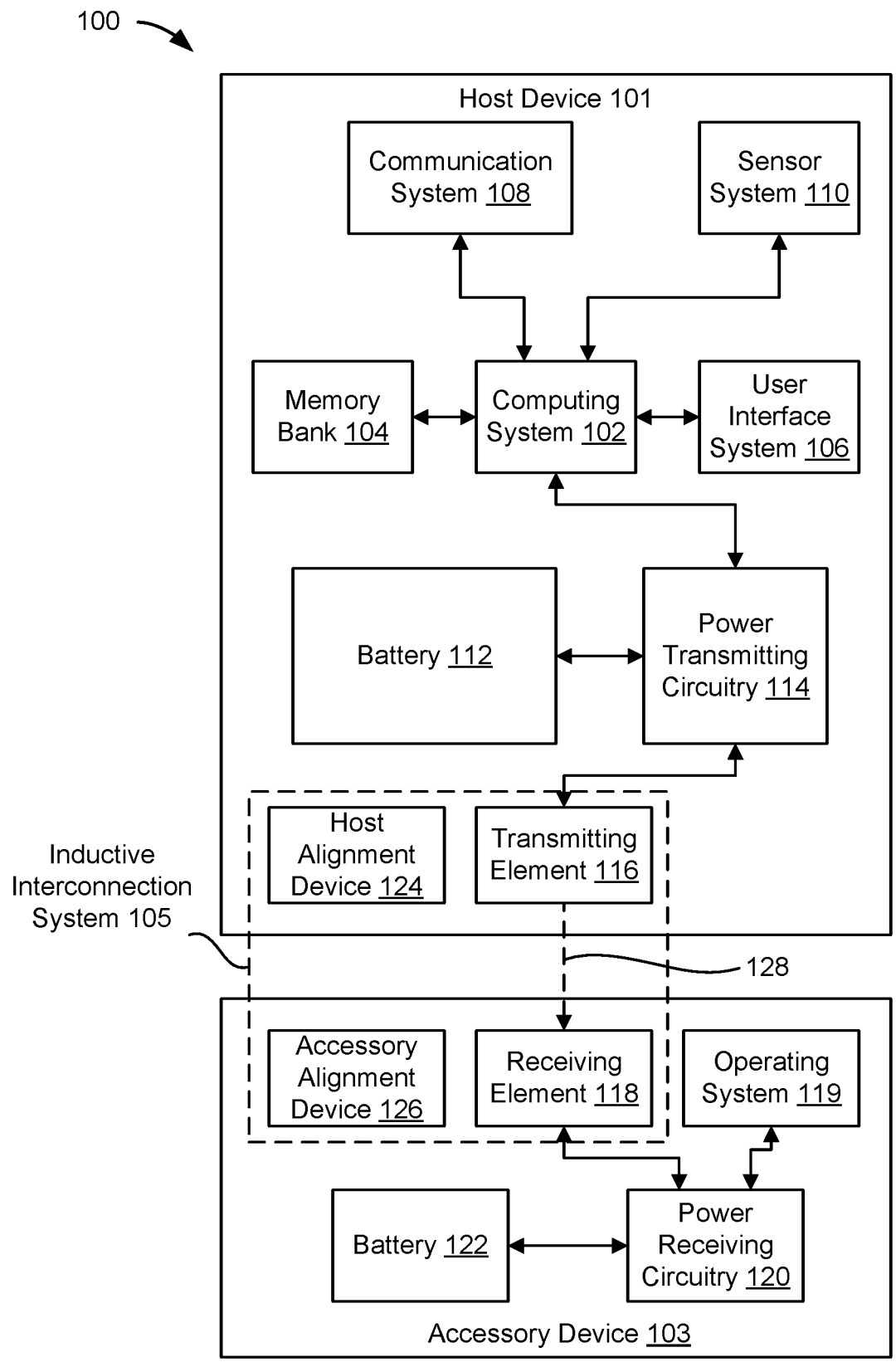
FIG. 1 is a block diagram illustrating an exemplary wireless charging system having an inductive interconnection system, according to some embodiments of the present disclosure.

FIG. 1 is a block diagram illustrating an exemplary wireless charging system 100 having an inductive interconnection system 105, according to some embodiments of the present disclosure. Wireless charging system 100 include a host device 101 and an accessory device 103 that is configured to receive power transmitted from host device 101. In some embodiments, host device 101 includes a computing system 102 coupled to a memory bank 104. Computing system 102 can execute instructions stored in memory bank 104 for performing a plurality of functions for operating device 101. Computing system 102 can be one or more suitable computing devices, such as microprocessors, computer processing units (CPUs), graphics processing units (GPUs), field programmable gate arrays (FPGAs), and the like.

Computing system 102 can also be coupled to a user interface system 106, communication system 108, and a sensor system 110 for enabling host device 101 to perform one or more functions. For instance, user interface system 106 can include a display, speaker, microphone, actuator for enabling haptic feedback, and one or more input devices such as a button, switch, capacitive screen for enabling the display to be touch sensitive, and the like. Communication system 108 can include wireless telecommunication components, Bluetooth components, and/or wireless fidelity (WiFi) components for enabling device 101 to make phone calls, interact with wireless accessories, and access the Internet. Sensor system 110 can include light sensors, accelerometers, gyroscopes, temperature sensors, and any other type of sensor that can measure a parameter of an external entity and/or environment.

Host device 101 can also include a battery 112. Battery 112 can be any suitable energy storage device, such as a lithium ion battery, capable of storing energy and discharging stored energy. The discharged energy can be used to power the electrical components of device 101.

In some embodiments, battery 112 can also be discharged to transmit power to accessory device 103. For instance, battery 112 can discharge energy to power transmitting circuitry 114, which can in turn drive a current through transmitting element 116. Driving current through transmitting element 116 can cause it to generate time-varying magnetic flux 128 that can propagate out of host device 101. Flux 128 can interact with receiving element 118 and cause a corresponding current to be generated in receiving element 118. This induced current can then be received by power receiving circuitry 120, which can convert the received power (e.g., alternating current (AC) power) into usable power (e.g., direct current (DC) power). The usable power can then be provided to battery 122 for storage or to operating system 119 for operating accessory device 103.

According to some embodiments of the present disclosure, transmitting element 116 and receiving element 118 together can be a part of an inductive interconnection system 105. As will be discussed further herein, inductive interconnection system 105 can be configured such that accessory device 103 can receive power from host device 101 when it is positioned in various rotational orientations. In some embodiments, inductive interconnection system 105 can also include a pair of alignment devices: a host alignment device 124 and an accessory alignment device 126. Host alignment device 124 can attract accessory alignment device 126 so that when they are fully attracted to each other, transmitting element 116 is aligned with receiving element 118 to ensure efficient power transfer between the two elements. Details of the inductive interconnection system 105 will be discussed further herein.

II. Inductive Interconnection System

As mentioned above, an interconnection system for a wireless charging system can include a transmitting element in a host device and a receiving element in an accessory device. The transmitting element can be configured to generate time-varying magnetic flux that can induce a corresponding current in the receiving element. The current can be converted to usable power and either stored as energy in the accessory device, or immediately used to operate the accessory device. According to some embodiments of the present disclosure, the transmitting and receiving elements each include a ferromagnetic structure and an inductor coil, as will be discussed further herein.

A. Transmitting Element

Figure 2A:
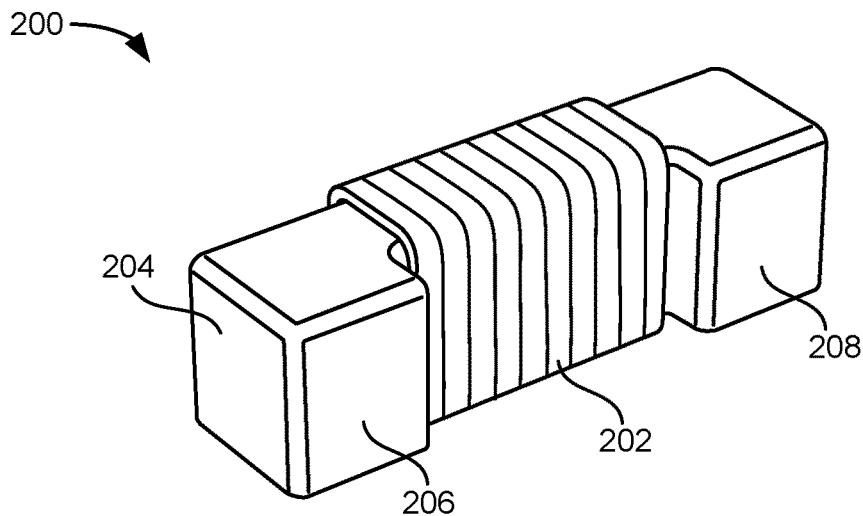
FIGS. 2A-2C illustrate different perspective views of an exemplary transmitting element, according to some embodiments of the present disclosure.
Figure 2B:
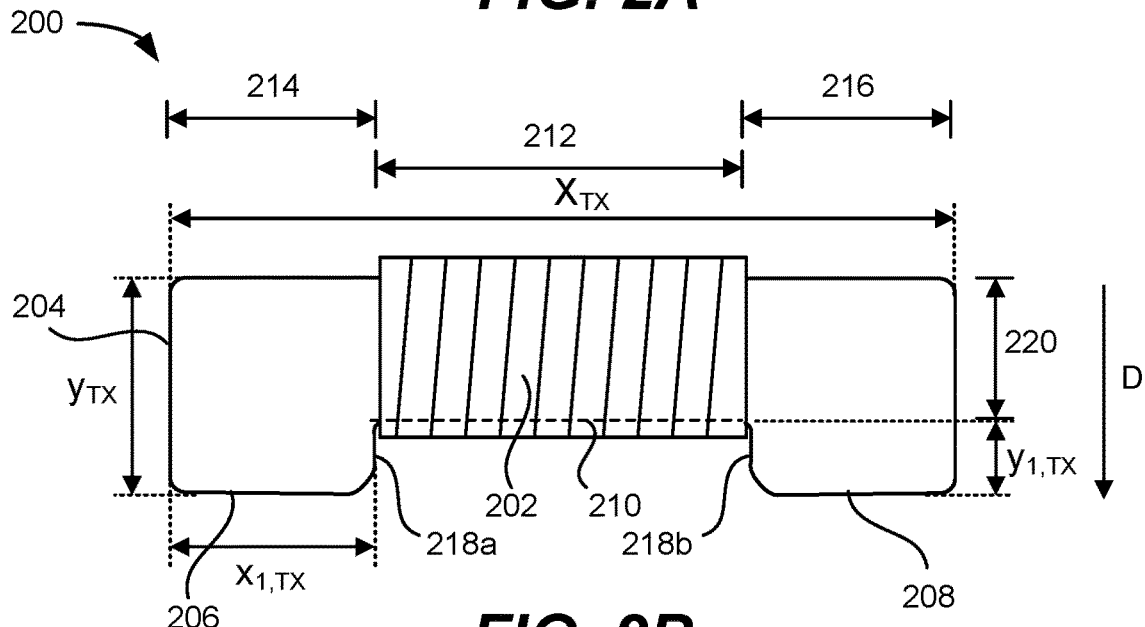
Figure 2C:
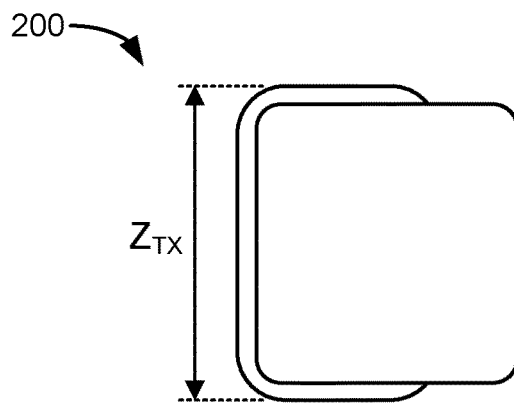

FIGS. 2A-2C illustrate different perspective views of an exemplary transmitting element 200, according to some embodiments of the present disclosure. Specifically, FIG. 2A illustrates a perspective view of transmitting element 200, FIG. 2B illustrates a top-down view of transmitting element 200, and FIG. 2C illustrates a side-view of transmitting element 200, according to some embodiments of the present disclosure.

With reference to FIG. 2A, transmitting element 200 can include a coil 202 and a ferromagnetic structure 204. Coil 202 can be a conductive strand of wire that is wound about a portion of ferromagnetic structure 204. When wound, coil 202 forms an inductor coil that can generate time-varying magnetic flux when current is driven through coil 202. Ferromagnetic structure 204 can be a structure that can redirect the propagation of magnetic flux. For instance, ferromagnetic structure 204 can be formed of a magnetic material including ferrite, such as MnZn. Because the magnetic properties of ferromagnetic structure 204 can redirect the magnetic flux generated by coil 202 through its body, ferromagnetic structure 204 can be configured to guide the magnetic flux toward certain directions based upon its structural design. For instance, ferromagnetic structure 204 can include interfacing surfaces 206 and 208 that are positioned past a side surface of a groove region 212 of ferromagnetic structure 204 to guide the magnetic flux toward a certain direction. A better illustration of the structural configuration of transmitting element 200 is the top-down view shown in FIG. 2B.

As shown in FIG. 2B, transmitting element 200 can include a groove region 212 defining two end regions 214 and 216 positioned on opposing sides of groove region 212. Coil 202 can be wound around groove region 212 and between (but not around) end regions 214 and 216. As mentioned herein, transmitting element 200 can include two interfacing surfaces 206 and 208. Interfacing surfaces 206 and 208 can be respective surfaces of end regions 214 and 216 that are positioned in the same plane. End regions 214 and 216 can protrude past a surface 210 of groove region 212 toward direction D such that the plane in which end regions 214 and 216 are positioned is disposed a distance $Y_{1,TX}$ away from a plane in which surface 210 resides. As can be noticed in FIG. 2B, surface 210 is hidden behind coil 202 but is represented by a dashed line for clarity. In some embodiments, surface 210 can be connected to interfacing surfaces 206 and 208 by sidewalls 218a and 218b. Thus, sidewalls 218a and 218b can be disposed between groove region 212 and end regions 214 and 216. Sidewalls 218a and 218b can extend a distance $Y_{1,TX}$, which can be selected to be any suitable distance equal to or greater than a thickness of coil 202. For instance, $Y_{1,TX}$ can be between 0.5 and 1.5 mm, such as 1 mm in a particular embodiment. As can be seen in FIG. 2B, the overall structure of transmitting element 200 can have a strong resemblance to the letter "U" of the English alphabet.

In some embodiments, transmitting element 200 can have an overall width $X_{TX}$ and an overall length $Y_{TX}$. As shown in FIG. 2B, width $X_{TX}$ and length $Y_{TX}$ can be a dimension of transmitting element 200 that extends in a direction that is perpendicular to the axis of coil 202. Additionally, end regions 214 and 216 can have a width $X_{1,TX}$. Dimensions $X_{TX}$, $Y_{TX}$, and $X_{1,TX}$ can be selected to achieve a certain degree of inductive coupling between transmitting element 200 and a receiving element, while resulting in an overall size that can fit within space constraints of a housing for a host device. In some instances, widths $X_{TX}$ and $X_{1,TX}$ are selected to be equal to the corresponding widths of the receiving element for efficient power transfer. Width $X_{TX}$ can range between 10 mm and 20 mm, width $X_{1,TX}$ can range between 3 mm and 4 mm, and length $Y_{TX}$ can range between 3 mm and 4 mm. In some embodiments, groove region 212 can have a length 220 that is defined by the difference between length $Y_{1,TX}$ and $Y_{TX}$. Thus, length 220 of groove region 212 can be less than length $Y_{TX}$ in particular embodiments. Accordingly, groove region 212 can have a smaller length than end regions 214 and 216.

Furthermore, as shown in the side-view perspective of transmitting element 200 in FIG. 2C, transmitting element 200 can also have a height $Z_{TX}$. In some embodiments, height $Z_{TX}$ is also selected to achieve a certain degree of inductive coupling between transmitting element 200 and a receiving element, while resulting in an overall size that can fit within space constraints of a housing for a host device. $Z_{TX}$ can range between 3 and 4 mm. As can be further seen in FIG. 2C, transmitting element 200 can have a cross-sectional profile that is in the shape of a rectangle. It is to be appreciated however that the rectangular cross-sectional profile of transmitting element 200 in FIG. 2C is merely exemplary and that other embodiments can have different profile shapes. For instance, some embodiments can have profiles that are substantially square, circular, ovular, triangular, trapezoidal, and the like.

It is to be appreciated that end regions 214 and 216 can protrude in any desired direction. The embodiment illustrated in FIG. 2B shows that end regions 214 and 216 can protrude toward direction D. In some embodiments, direction D is a direction that points toward a receiving element so that magnetic fields generated by coil 202 are redirected toward the receiving element by ferromagnetic structure 204, as will be discussed further herein with respect to FIG. 5.

Figure 3A:
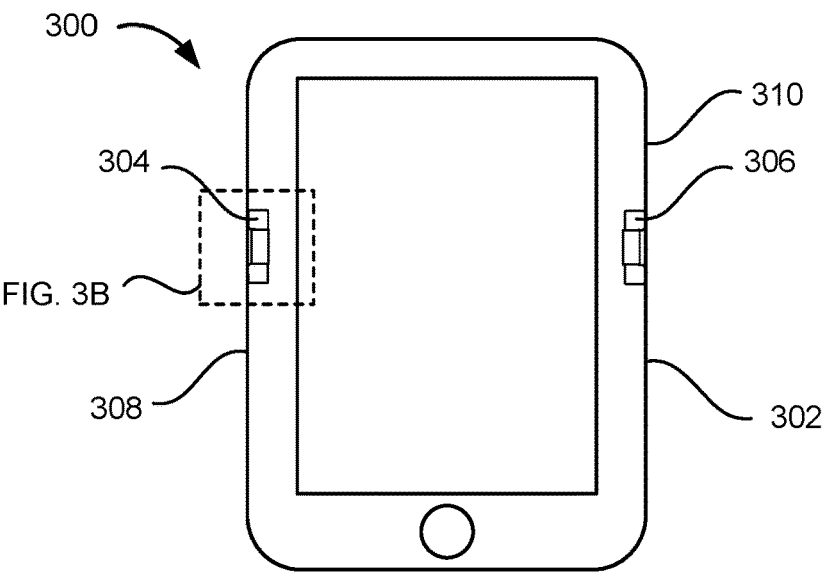
FIG. 3A illustrates a top-down view of an exemplary host device having two transmitting elements, according to some embodiments of the present disclosure.
Figure 3B:
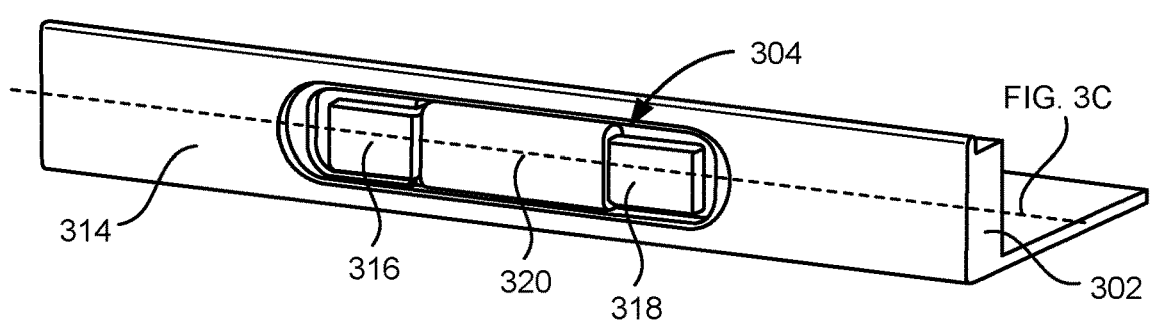
FIG. 3B illustrates a perspective view of a portion of the host device shown in FIG. 3A where the transmitting element is incorporated in a housing and some surfaces of the transmitting element are exposed, according to some embodiments of the present disclosure.
Figure 3C:
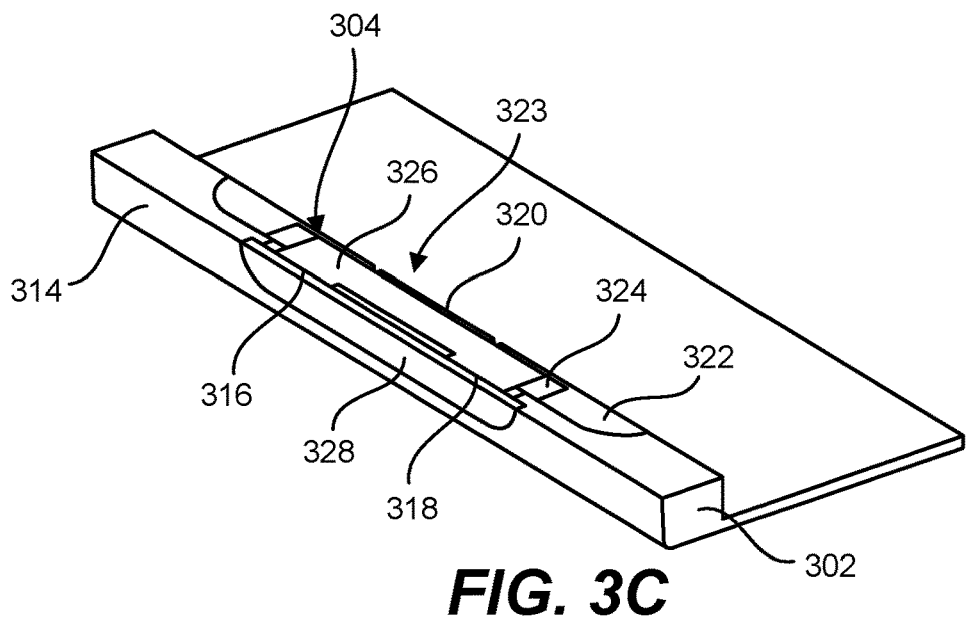
FIG. 3C illustrates a perspective view of a cross-section of the illustration shown in FIG. 3B along the illustrated cut-line, according to some embodiments of the present disclosure.

FIGS. 3A-3C illustrate a transmitting element incorporated into a host device, according to some embodiments of the present disclosure. Specifically, FIG. 3A illustrates a top-down view of an exemplary host device 300 having two transmitting elements, according to some embodiments of the present disclosure. Host device 300 can be a variety of different electronic devices including, for example, a tablet computer, a smart phone, a laptop computer, among others.

With reference to FIG. 3A, a host device 300 can include a housing 302 and one or more transmitting elements disposed within housing 302. For example, host device 300 can include two transmitting elements: a first transmitting element 304 and a second transmitting element 306. First and second transmitting elements 304 and 306 can be positioned proximate to outer surfaces of housing 302 so that they can be positioned as close as possible to an external device, such as an accessory device that contacts an outer surface of housing 302 to wirelessly receive power from host device 300. In some embodiments, first and second transmitting elements 304 and 306 can be located at opposite sides of housing 302. For instance, first transmitting element 304 can be located at a left side 308 of housing 302, and second transmitting element 306 can be located at a right side 310 of housing 302. Being positioned at left and right sides 308 and 310 of housing 302 enables host device 300 to transmit power to an accessory device on the left and right sides of housing 302.

Although FIG. 3A illustrates host device 300 as having two transmitting elements 304 and 306, embodiments are not limited to such configurations. Additional or alternative embodiments can have more or less than two transmitting elements. For instance, some embodiments can have four transmitting elements, one located on each of the four sides of host device 300, or three transmitting elements located on left, right, and top sides of host device 300. Furthermore, FIG. 3A illustrates two transmitting elements located only at sides of housing 302. Embodiments, however, are not so limited. Some embodiments can have a transmitting element positioned proximate to a face of host device 300 so that an accessory device can receive power from host device 300 by resting on the face of host device 300.

FIG. 3B illustrates a perspective view of a portion 312 of host device 300 shown in FIG. 3A where transmitting element 304 is incorporated in housing 302 and some surfaces of transmitting element 304 are exposed, according to some embodiments of the present disclosure. As shown, transmitting element 304 is positioned within housing 302 but proximate to an outer surface 314 of housing 302. According to some embodiments of the present disclosure, interfacing surfaces 316 and 318 of transmitting element 304 can face outward, away from outer surface 314, so that magnetic flux generated by transmitter coil 320 of transmitting element 304 can be directed outward toward a receiving element, as will be discussed further herein.

To have a better understanding of how transmitting element 304 is incorporated in housing 302, FIG. 3C illustrates a perspective view of a cross-section of the illustration shown in FIG. 3B along the illustrated cut-line. Transmitting element 304 can be fixed in housing 302 by a bracket 322 that is secured to housing 302. Bracket 322 can be any suitable structure formed of a stiff material, such as stainless steel, and can be secured to housing 302 in any suitable way, such as with an adhesive 324 or a mechanical fastener (not shown). When secured, bracket 322 can press transmitting element 304 against housing 302 to fix it in place with the help of an adhesive material 324. Bracket 322 can include an opening 323 into which transmitter coil 320 can extend to minimize the amount of space occupied by the entire module. Interfacing surfaces 316 and 318 of ferromagnetic structure 326 can face outward and be covered by a radio frequency (RF) window 328. RF window 328 can be formed of a material that is transparent to magnetic flux while also providing a degree of protection against physical damage, such as ceramic, sapphire, and the like.

A. Receiving Element

As discussed herein, the structural design of the ferromagnetic structure of a transmitting element enables it to directionally transmit power to a receiving element by way of its protruded interfacing surfaces. Similarly, a receiving element can include a ferromagnetic structure that is specifically designed to receive the time-varying magnetic flux propagating out of the interfacing surfaces of the transmitting element when the receiving element is positioned across from the transmitting element.

Figure 4:
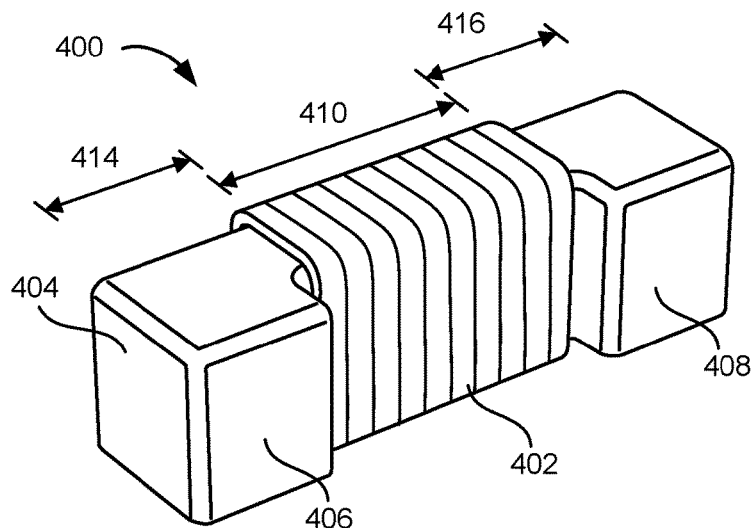
FIG. 4 illustrates an exemplary receiving element configured to receive power from a transmitting element when it is positioned at any point along a limited angular rotation, according to some embodiments of the present disclosure.

In some embodiments, the construction of a receiving element can be substantially similar to the construction of a transmitting element form which it receives wireless power. For instance, FIG. 4 illustrates an exemplary receiving element 400 configured to receive power from a transmitting element when it is positioned directly across from the transmitting element, according to some embodiments of the present disclosure. In certain embodiments, receiving element 400 can be substantially similar to a transmitting element, like transmitting element 200 in FIG. 2A. Thus, receiving element 400 can include a coil 402 wound about a groove region 410 of ferromagnetic structure 404. End regions 414 and 416 can be positioned on opposing sides of groove region 410 and protrude past a side surface of ferromagnetic structure 404. End regions 414 and 416 can also include interfacing surfaces 406 and 408 through which magnetic flux can enter into and be redirected through ferromagnetic structure 404 to induce a corresponding current in coil 402 during wireless power transfer. In some embodiments, coil 402 is formed of approximately 85 turns in a dual-layer configuration, meaning two layers of turns: a first layer of turns that winds between interfacing surfaces 406 and 408, and a second layer of turns that winds on top of the first layer and between interfacing surfaces 406 and 408.

Figure 5:
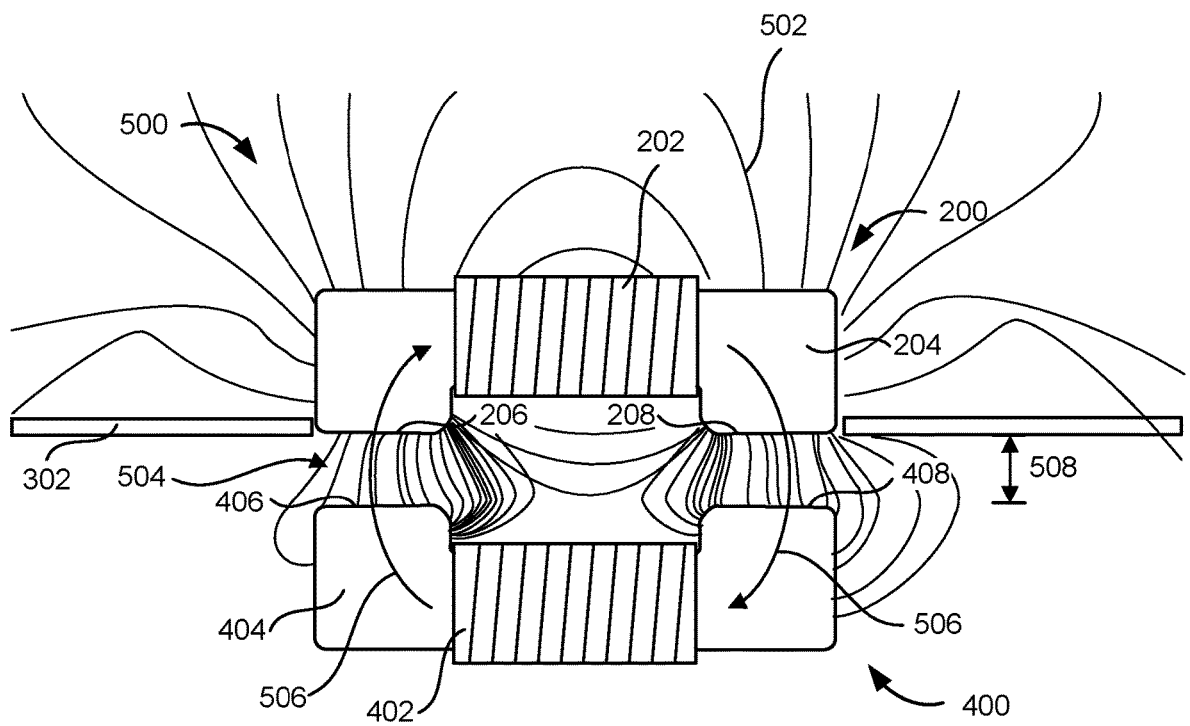
FIG. 5 illustrates exemplary magnetic interactions between a transmitting element and a receiving element in an inductive interconnection system during wireless power transfer, according to some embodiments of the present disclosure.

FIG. 5 illustrates exemplary magnetic interactions between transmitting element 200 and receiving element 400 in an inductive interconnection system 500 during wireless power transfer, according to some embodiments of the present disclosure. In this embodiment, transmitting element 200 and receiving element 400 are substantially similar in construction, as discussed herein with respect to FIG. 4. Furthermore, transmitting element 200 is shown as being housed within housing 302.

During wireless power transfer, coil 202 can generate a plethora of time-varying magnetic flux 502 that can propagate in many different directions. According to some embodiments of the present disclosure, a substantial majority of magnetic flux is redirected by ferromagnetic structure 204 so that the flux exits or enters through interfacing surfaces 208 and 206. As mentioned herein, the shape of ferromagnetic structure 204 can direct the flux toward a certain direction by way of the protruding portions, which in this case is toward receiving element 400. Accordingly, a concentration of magnetic flux 502 can exist in regions 504 between corresponding interfacing surfaces of ferromagnetic structures 204 and 404.

Depending on the direction of current flowing through coil 202, a substantial amount of magnetic flux 502 generated by coil 202 can first flow out of interfacing surface 208 and into interfacing surface 408 of ferromagnetic structure 404, which can then propagate through ferromagnetic structure 404 and exit out of interfacing surface 406 so that magnetic flux 502 can enter back into ferromagnetic structure 204 through interfacing surface 206. The resulting flow magnetic flux forms a magnetic loop 506 that induces a current in coil 402 that can be used to provide power to an accessory device within which receiving element 400 is disposed. It is to be appreciated that although magnetic loop 506 is shown in a clockwise direction, magnetic loop 506 can also propagate in a counter-clockwise direction when current is flowing through coil 202 in an opposite direction.

Although FIG. 5 illustrates transmitting element 200 as transmitting power to receiving element 400, embodiments are not so limited. Other embodiments can reverse the transfer of power such that transmitting element 200 receives power from receiving element 400. As an example, current can be driven into coil 402 of receiving element 400 such that coil 402 generates time-varying magnetic flux. The generated time-varying magnetic flux can be redirected by ferromagnetic structure 404, which can be received by ferromagnetic structure 204. The received magnetic flux in ferromagnetic structure 204 can induce a corresponding current in coil 202, which can be used to provide power to a host device within which transmitting element 200 is disposed.

As can be understood in FIG. 5, the orientation of receiving element 400 with respect to transmitting element 200 can substantially affect the efficiency at which power is transferred in inductive interconnection system 500. In some embodiments, optimal power transfer is achieved when transmitting element 200 is aligned with receiving element 400, and when the two elements are oriented such that interfacing surfaces 406 and 408 of ferromagnetic structure 404 are facing toward corresponding interfacing surfaces 206 and 208 of ferromagnetic structure 204. Furthermore, optimal power transfer can be achieved when the separation distance 426 between transmitting and receiving elements 200 and 400 is minimized.

According to some embodiments of the present disclosure, receiving element 400 can be incorporated within an accessory device to enable wireless power transfer between a host device, e.g., host device 300 in FIG. 3, and the accessory device. FIG. 6 is a simplified perspective view diagram of an exemplary accessory device 600, according to some embodiments of the present disclosure. As shown in FIG. 6, accessory device 600 can be any suitable electronic device having an operating system, power receiving circuitry, and a battery, such as accessory device 103 in FIG. 1. Accessory device 600 can be operated to input data into a host device. As an example, accessory device 600 can be a stylus or a smart pencil that a user can use to make contact with the host device to input data into the host device. Accordingly, in some embodiments, accessory device 600 can include a housing 602 having a back end 606 and an interfacing end 604 opposite of back end 606 that is configured to make contact with the host device. For instance, interfacing end 604 can have a structure that tapers to a tip to mimic the tip of a conventional writing utensil, such as a pencil or pen.

In some embodiments, housing 602 of accessory device 600 can include a curved surface portion 608 and a flat portion 610 that both extend between at least a portion of interfacing end 604 and back end 606 of housing 602. Flat portion 610 can include a receiving surface 611, against which a housing for a host device can be positioned to effectuate wireless power transfer, as will be discussed herein with respect to FIGS. 7A-7B and 8A. According to some embodiments, accessory device 600 can include a receiving element 612 disposed within and adjacent to flat portion 610 of housing 602. Receiving element 612 can have the same form and function as receiving element 400 discussed herein with respect to FIGS. 4 and 5. Thus, receiving element 612 can include a ferromagnetic structure 605 having interfacing surfaces 614 and 616, and a receiver coil 618 wound about a groove region (not shown, but similar to groove region 410 of receiving element 400 in FIG. 4) of ferromagnetic structure 605. In some embodiments, interfacing surfaces 614 and 616 can face toward flat portion 610 of housing 602 so that accessory device 600 can wirelessly receive power by interacting with magnetic flux propagating from a transmitting element through flat portion 610. The cross sectional profile of housing 602 can resemble an upper case letter "D", as better illustrated in FIGS. 7A and 7B.

FIGS. 7A and 7B illustrate cross-sectional views of accessory device 600 at different locations, according to some embodiments of the present disclosure. Specifically, FIG. 7A is a simplified cross-sectional diagram 700 of accessory device 600 at a point across receiver coil 618 of receiving element 612, and FIG. 7B is a simplified cross-sectional diagram of accessory device 600 at a point across interface surface 616 of receiving element 612, according to some embodiments of the present disclosure.

As shown in FIG. 7A, housing 602 includes curved portion 608 and flat portion 610 that extend along a length (i.e., parallel to the center axis) of housing 602. Curved and flat portions 608 and 610 can form a monolithic structure that can enclose one or more electrical components within it, such as receiving element 612, as discussed herein with respect to FIG. 6. In addition to receiving element 612, housing 602 can also enclose various other components such as, but not limited to, a shield 702, a support frame 704, one or more electrical components 715, and a driver board 717 upon which component 715 is mounted. Shield 702 can be formed of any material suitable for blocking magnetic flux propagating around receiving element 612 from being exposed on electrical component(s) 715 within housing opening 710 of housing 602. For instance, shield 702 can be formed of copper. Electrical component(s) 715 can be any suitable electronic device for operating accessory device 600 and/or receiver coil 618. For instance, electrical component(s) 715 can be a microcontroller, field programmable logic array (FPGA), application specific integrated circuit (ASIC), and the like. Electrical component(s) 715 can be electrically coupled to receiver coil 618 of receiving element 612 to receive wireless power, such as by receiving current from receiver coil 618 induced by a magnetic flux generated by a transmitter element.

Figure 9:
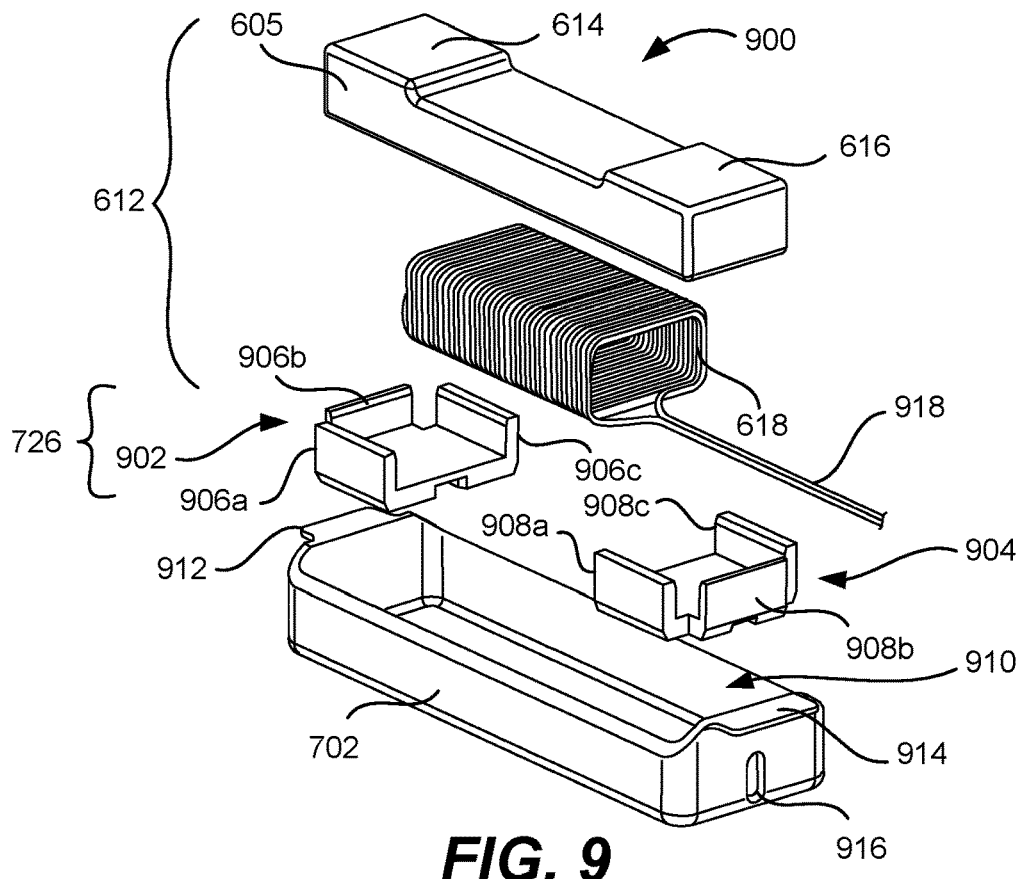
FIG. 9 is an exploded view diagram of an exemplary receiving assembly, according to some embodiments of the present disclosure.

In some embodiments, shield 702 is constructed and positioned in a way that enhances the blockage of magnetic flux. For instance, shield 702 can include an inner bottom surface 714 and inner side surfaces 716 and 718 that form a cavity within which receiving element 612 is disposed so that shield 702 is positioned around five sides of receiving element 612. A perspective view of shield 702 is shown in FIG. 9, which will be discussed further herein. By being positioned around five sides of receiving element 612, shield 702 can enhance its ability to block magnetic flux from propagating into opening 710 and/or outside of accessory device 600. In some embodiments, shield 702 can include outer side surfaces 720 and 722 and outer back surface 724. Outer sides surfaces 720 and 722 can conform to the profile of support frame 704 and thus have a curved profile, while outer back surface 724 can be substantially flat to provide space, e.g., housing opening 710, within which components, e.g., electrical component(s) 715, of accessory device 600 can be positioned. In some embodiments, the thickness of shield 702 is greater for regions between inner side surfaces 716 and 718 and respective outer side surfaces 720 and 722, as shown in FIG. 7A. The thicker parts of shield 702 can provide a more structurally robust shielding component, as well as provide additional structural protection for receiving element 612. In particular embodiments, outer back surface 724 is positioned along a center vertical line 712 that divides the accessory device into two halves. In such embodiments, shield 702 is positioned within regions of one half of the accessory device.

Support frame 704 can be any suitable structure capable of providing structural support for housing 602 and protection for the internal components of accessory device 600 from mechanical stress. In certain embodiments, support frame 704 is positioned against an inner surface of housing 602 and extends along an area of the inner surface except for regions between receiving element 612 and flat portion 610 of housing 602, as shown in FIG. 7A. Support frame 704 can be formed of any suitable stiff material, such as aluminum, steel, and the like.

In some embodiments, a gap 706 can exist between receiving element 612 and inner side surfaces 716 and 718 and bottom surface 714 of shield 702. Gap 706 can be vacant space that helps to electrically isolate receiver coil 618 from shield 702 to ensure optimal operating efficiency of receiver coil 618. If gap 706 is too small, receiver coil 618 may be too close to shield 702, thereby decreasing the efficiency at which receiver coil 618 can operate. In some embodiments, gap 706 is between 0.2 and 0.4 mm, particularly 0.3 mm in certain embodiments. Receiving element 612 can be physically coupled to shield 702 to minimize susceptibility to mechanical strain. For instance, receiving element 612 can be coupled to shield 702 by one or more spacers 726, as shown in FIG. 7B. Spacers 726 can be directly attached to ferromagnetic structure 605 of receiving element 612 and inner bottom surface 714 and at least a portion of both inner side surfaces 716 and 718 of shield 702. In some embodiments, spacers 726 are positioned against surfaces of ferromagnetic structure 605 opposite of interface surfaces 614 and 616. Thus, spacers 726 can be positioned on opposite sides of receiver coil 618. Any suitable adhesive, such as pressure sensitive adhesive (PSA), can be used to attach spacer 726 between ferromagnetic structure 605 and shield 702. Utilizing spacers 726 can fix receiving element 612 in space to prevent it from shifting around during use. In some embodiments, spacer 726 is designed to have a thickness suitable for positioning receiving element 612 a certain distance away from shield 702 to ensure electrical isolation of receiver coil 618 and shield 702. For example, spacer 726 can have a thickness between 0.5 and 0.7 mm, particularly approximately 0.6 mm in some instances.

It is to be appreciated that even though FIGS. 6 and 7A-7B illustrate an accessory device as having a housing that includes only one flat region, embodiments are not so limited. Other embodiments can have more flat regions around housing, such as two, three, or even six. Furthermore, an accessory device may not have any curved regions in its housing. Instead, the housing can be formed of a plurality of flat regions so that the cross-sectional profile is in a geometrical shape, such as a triangle, square, rectangle, pentagon, hexagon, and the like. It is to be appreciated that any suitable cross sectional profile can be used without departing from the spirit and scope of the present disclosure.

During the operation of a wireless charging system, as discussed herein with respect to FIG. 5, a transmitting element can be positioned near a receiving element to effectuate wireless power transfer by generating magnetic flux, which can interact with the receiving element to induce a current in the receiving element to charge a battery of an accessory device. An example of a wireless charging system including accessory device 600 is shown in FIGS. 8A-8B.

Figure 8A:
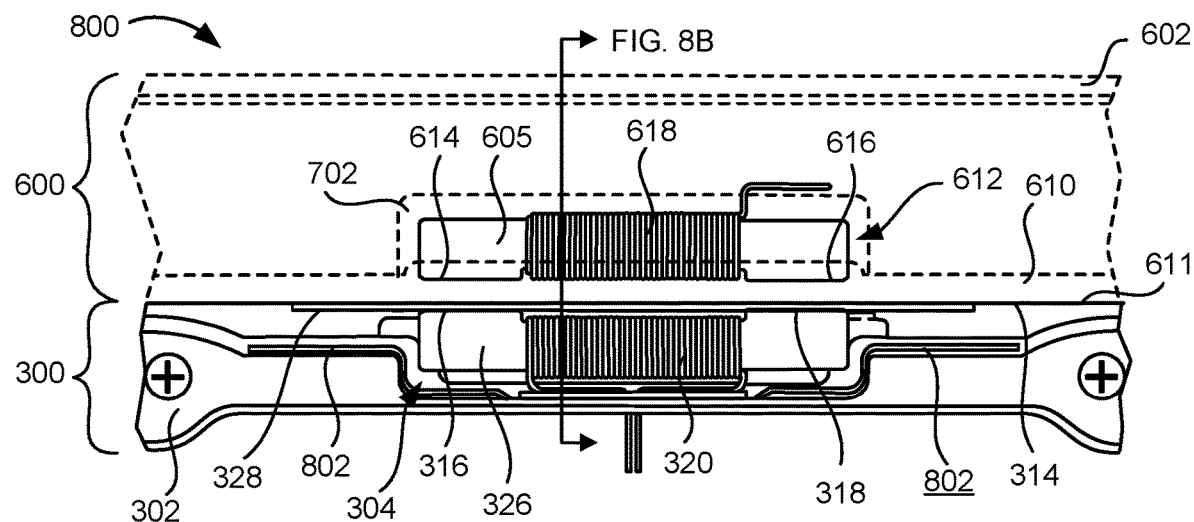
FIG. 8A is a simplified top-down view of an exemplary wireless charging system, according to some embodiments of the present disclosure.
Figure 8B:
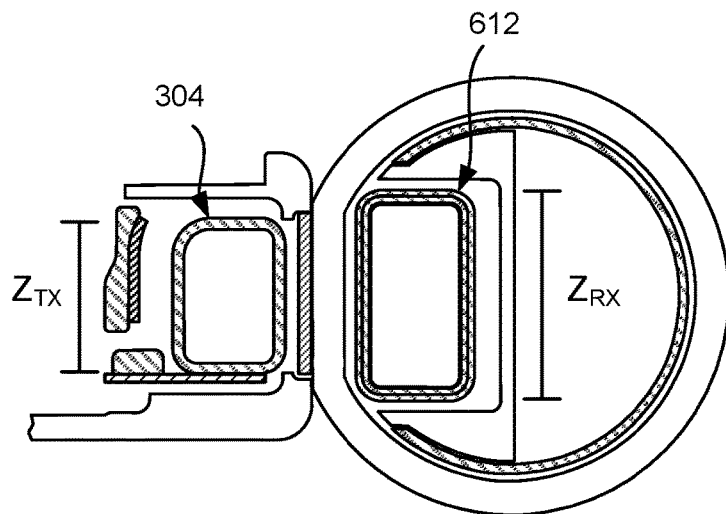
FIG. 8B is a simplified cross-sectional view of an exemplary wireless charging system, according to some embodiments of the present disclosure

FIG. 8A is a simplified top-down view of an exemplary wireless charging system 800, according to some embodiments of the present disclosure; and, FIG. 8B is a simplified cross-sectional view of exemplary wireless charging system 800, according to some embodiments of the present disclosure. System 800 includes an accessory device, e.g., accessory device 600, as discussed herein with respect to FIGS. 6 and 7A-7B, and a host device, e.g., host device 300 discussed herein with respect to FIGS. 3A-3C, to which accessory device 600 is coupled to receive power wirelessly. For brevity, reference numerals used in FIGS. 3A-3C, 6, and 7A-7B are used in FIG. 8 to indicate their correlation, and thus details of such components can be referenced in the respective figures. Furthermore, for clarity and ease of understanding, housing 602 and shield 702 of accessory device 600 are drawn with dotted lines while housing 302 of host device 300 is drawn with solid lines, and portions of respective housings are transparent so the internal components of the devices can be seen.

As shown, accessory device 600 is positioned against host device 300 to allow wireless power transfer. When positioned, receiving surface 611 of accessory device 600 can be in contact, or in close proximity to, outer surface 314 of host device 300; and, both receiving element 612 and transmitting element 304 can be positioned so that interface surfaces 614 and 616 of receiving element 612 face toward interface surfaces 316 and 318 of transmitting element 304 to concentrate the propagation of magnetic flux between them, which is discussed herein with respect to wireless charging system 500 in FIG. 5. That way, magnetic flux generated by transmitter coil 320 can be redirected by ferromagnetic structure 326 toward ferromagnetic structure 605, and then induce a corresponding current in receiver coil 618 by propagating through ferromagnetic structure 605.

During wireless power transfer, shield 702 can prevent stray flux from exposing onto other internal components within accessory device 600 or from exiting out of housing 602. Similarly, host device 300 can also include a shield 802 to prevent stray flux from exposing onto other internal components within host device 300 or from exiting out of housing 302. Shield 802 can be a sheet of copper, or any other suitable material for blocking magnetic flux, that extends behind transmitting element 304, e.g., on a side of transmitting element 304 opposite of the side where transparent window 328 is positioned. In some embodiments, shield 802 can extend beyond the farthest left and right edges of transmitting element 304 to enhance the shielding capabilities of shield 802.

In some embodiments, flat portion 610 of housing 602 can be transparent to magnetic flux such that magnetic flux can freely pass through its structure, while also providing a degree of protection against physical damage. For instance, flat portion 610 can be formed of a material such as ceramic, sapphire, and the like. In some embodiments, the entire flat portion 610 can be transparent to magnetic flux, or only a part of the flat portion 610 that is disposed along the path of magnetic flux propagation, such as parts of flat portion 610 that are covering interface surfaces 614 and 616 or parts of flat portion 610 that are positioned directly across from RF window 328, can be transparent to magnetic flux. That way, magnetic flux generated by transmitting element 304 can freely travel through RF window 328 and flat portion 610 of housing 602 to be received by receiving element 612 to effectuate wireless power transfer.

In some embodiments, the relative dimensions of transmitting element 304 and receiving element 612 can be adjusted to improve alignment tolerances so that accessory device 600 can still receive power from host device 300 when accessory device 600 is not exactly aligned with host device 300, e.g., when the respective horizontal axes of transmitting element 304 and receiving element 612 do not overlap with one another. For instance, as shown in FIG. 8B, height $Z_{TX}$ of transmitting element 304 can be shorter than a height $Z_{RX}$ of receiving element 612. By having a greater height $Z_{RX}$, receiving element 612 can shift a few millimeters upward or downward and still be suitably positioned to receive power from transmitting element 304 without suffering a significant decrease in power transfer efficiency.

Figure 10:
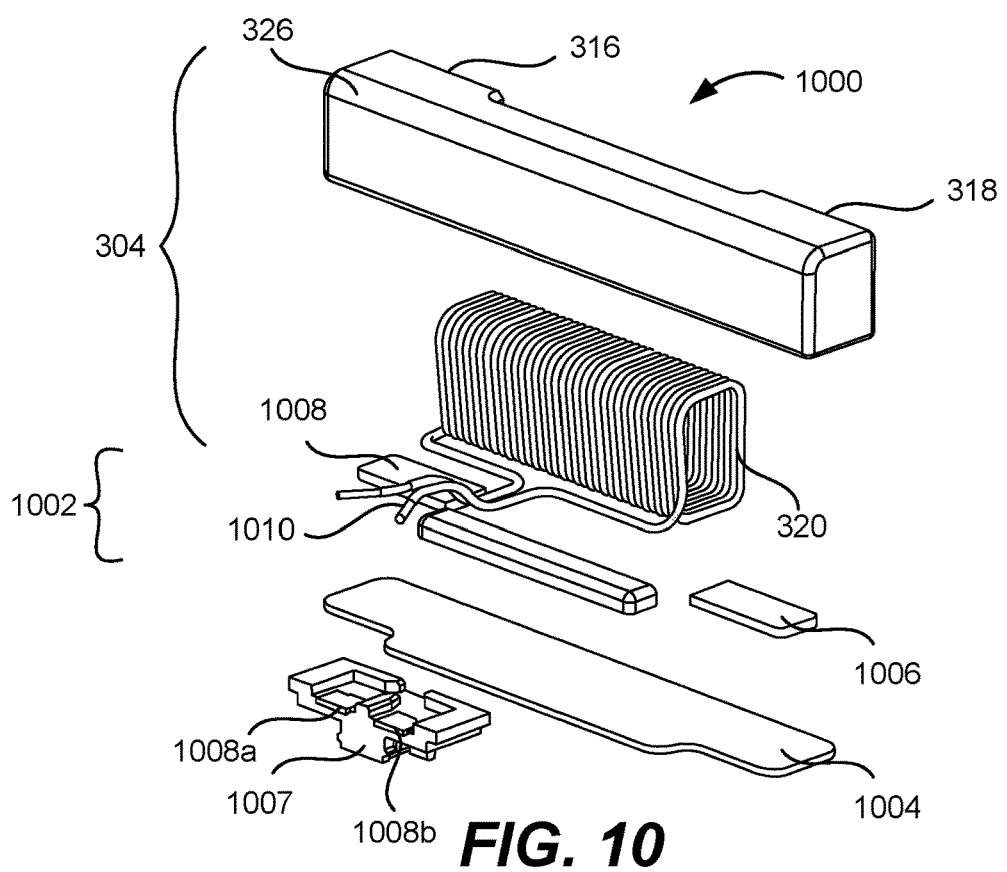
FIG. 10 is an exploded view diagram of an exemplary transmitting assembly, according to some embodiments of the present disclosure.

FIGS. 9 and 10 are exploded view diagrams of receiving and transmitting assemblies 900 and 1000 to better illustrate the different components that form the receiving and transmitting elements. Specifically, FIG. 9 is an exploded view diagram of receiving assembly 900 including receiving element 612, and FIG. 10 is an exploded view diagram of an exemplary transmitting assembly 1000 including transmitting element 304.

As shown in FIG. 9, receiving assembly 900 can include receiving element 612, shield 702, and spacer 726. Receiving element 612 can include ferromagnetic structure 605 and receiver coil 618 as discussed herein with respect to FIG. 6. These components are also discussed in more detail with respect to corresponding components 404 and 402 in FIG. 4. Shield 702 can block magnetic flux from propagating to other internal components of accessory device 600 as well as block magnetic flux from exiting accessory device 600, and spacer 726 can fix receiving element 612 in position and prevent receiver coil 618 from being too close to shield 702, as discussed herein with respect to FIG. 7B. Shield 702 can be a five-sided box formed of four sidewalls and a back wall that forms a cavity 910 within which receiving element 612 and spacer 726 can be disposed. When disposed in cavity 910, interface surfaces 614 and 616 of receiving element 612 can face toward outside of cavity 910. In some instances, shield 702 can include two extensions 912 and 914 to provide more surface area with which to attach to an anchor point within housing 602 of accessory device 600. Extensions 912 and 914 can extend from respective sidewalls of shield 702 in a direction parallel to a plane in which the back wall is oriented. Extensions 912 and 914 can be secured to an anchor point to prevent shield 702 from shifting and becoming loose. In addition, shield 702 can also include an opening 916 near the back side of shield 702. Opening 916 can provide a passage way through which wires can thread. For example, wire 918 that forms receiver coil 618 can enter and exit cavity 910 of shield 702 through opening 916. That way, wire 918 can make electrical connection with a driver board (not shown) or any other driving component configured to operate receiver coil 618 during wireless power transfer.

In some embodiments, spacer 726 can be formed of two separate parts: a first part 902 and a second part 904. Each part 902 and 904 can be attached to and positioned behind a respective portion of ferromagnetic structure 605. For instance, first part 902 can be positioned behind interface surface 614 and second part 904 can be positioned behind interface surface 616. Spacer 726 is made up of two parts so that receiver coil 618 can be positioned between first and second parts 902 and 904 of spacer 726. In some embodiments, each part 902 and 904 can include a retainer that overlaps parts of ferromagnetic structure 605. As an example, first part 902 can include individual retainers 906a-c coupled to a back retainer 907 and second part 904 can include individual retainers 908a-c coupled to a back retainer 909. Individual retainers 906a-c and back retainer 907 can form a monolithic structure, and the same can be said for retainers 908a-c and back retainer 909. Each retainer can overlap respective portions of top, bottom, and side surfaces of ferromagnetic structure 605 to increase the amount of surface area parts 902 and 904 are in contact with ferromagnetic structure 605. This increase in surface area creates a stronger coupling between spacer 726 and ferromagnetic structure 605 so that spacer 726 can better fix receiving element 612 in place and prevent it from detaching and becoming loose when experiencing drop events. Although FIG. 9 illustrates retainers 906a-c and 908a-c as individual, separate extensions of respective back retainers 908 and 908, embodiments are not limited to such embodiments. In some instances, instead of having multiple individual retainers, each part 902 and 904 can have a single retainer that wraps around three consecutive sides of ferromagnetic structure 605 in an uninterrupted manner.

With reference to FIG. 10, transmitting assembly 1000 can include transmitting element 304, spacer 1002, and a stiffener 1004. Transmitting element 304 can include ferromagnetic structure 326 and transmitter coil 320 as discussed herein with respect to FIGS. 3A-3C. These components are also discussed in more detail with respect to corresponding components 204 and 202 in FIGS. 2A-2C. Stiffener 1004 can be a hard component that provides structural support for transmitting element 304 and provide a structure upon which transmitting element 304 can be mounted. In some embodiments, stiffener 1004 is a plate that is formed of a stiff material, such as, but not limited to, FR4. Spacer 1002 can be formed of two parts: a first part 1006 and a second part 1008, that can be positioned on either end of transmitter coil 320. Spacer 1002 can couple ferromagnetic structure 326 to stiffener 1004 so that transmitting element 304 is substantially fixed in place. In some embodiments, transmitting element 304 is attached to stiffener 1004 so that interface surfaces 316 and 318 are facing in a direction that is perpendicular to the direction in which stiffener 1004 is facing. That way, interface surfaces 316 and 318 can be positioned to direct magnetic flux to a receiving element, as shown and discussed herein with respect to FIGS. 3B-3C and 5. Wire 1010 that is used to form transmitter coil 320 can be coupled to a connector 1007 containing contact pads 1008a-b. Each termination end of transmitter coil 320 can make contact with a respective contact pad so that wire 1010 can make electrical connection with a driver board (not shown) or any other driving component configured to operate transmitter coil 320 during wireless power transfer.

Although the wireless charging systems discussed herein with respect to FIGS. 5 and 8A have the transmitting and receiving elements positioned so that the respective interface surfaces are directly facing one another for wireless power transfer, embodiments are not limited to such alignment constraints. Rather, some embodiments herein enable wireless charging even though transmitting and receiving elements are not directly facing one another. For instance, the receiving element can be specifically designed to receive the time-varying magnetic flux propagating out of the interfacing surfaces in various rotatable orientations. As an example, the receiving element can have a design that enables power transfer at any point along a limited angular rotation and another design that enables power transfer at any point along a complete 360° angular rotation, as will be discussed further herein.

1. Receiving Element Enabling Limited Angular Rotation

The transmitting element in a host device can transmit power to a receiving element by way of the interfacing surfaces of its ferromagnetic structure. According to some embodiments of the present disclosure, the receiving element can be specifically designed to receive the time-varying magnetic flux propagating out of the interfacing surfaces so that the receiving element can still receive power from the transmitting element when it is positioned at any point along a limited angular rotation.

Figure 11A:
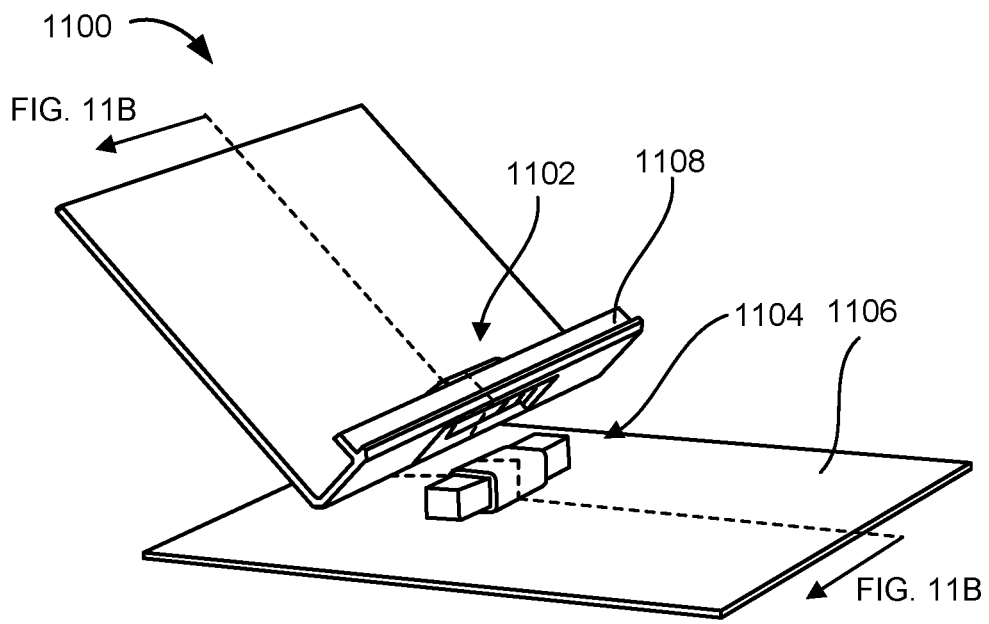
FIG. 11A illustrates a perspective view of an inductive interconnection system where a transmitting element is positioned at an angle with respect to a receiving element, according to some embodiments of the present disclosure.

According to some embodiments of the present disclosure, the concentration of magnetic flux between interfacing surfaces of transmitting and receiving elements 200 and 400 (discussed herein with respect to FIGS. 2A-2C and 4) enables sufficient power transfer even when separation distance 426 is increased due to an adjustment of an angular orientation of transmitting element 200 with respect to receiving element 400. FIG. 11A illustrates a perspective view of an inductive interconnection system 1100 where a transmitting element 1102 is positioned at an angle with respect to a receiving element 1104, according to some embodiments of the present disclosure. Transmitting and receiving elements 1102 are similar in function and construction as transmitting and receiving elements 200 and 400 discussed herein with respect to FIGS. 2A-2C and 4. Thus, detailed descriptions of such elements can be referenced in those figures and are not discussed here for brevity.

Figure 11B:
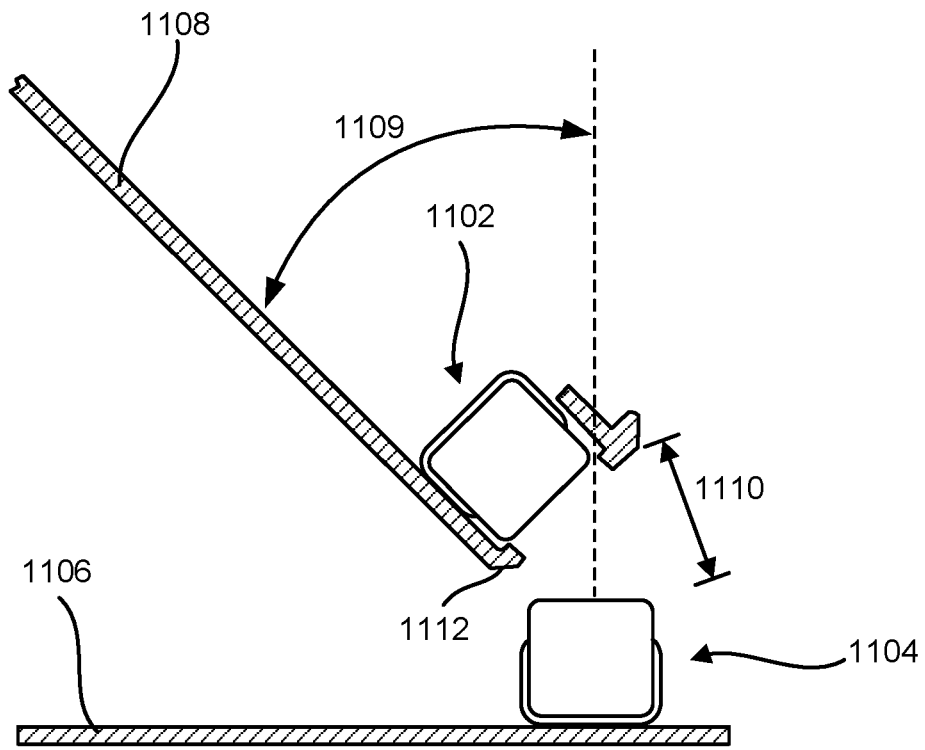
FIG. 11B illustrates a cross-sectional view along the dotted cut line through the inductive interconnection system shown in of FIG. 6A, according to some embodiments of the present disclosure.

As shown, transmitting element 1102 is disposed within housing 1108 of a host device and is positioned proximate to receiving element 1104 that is disposed within housing 1106 of an accessory device. In some instances, housing 1108 can be rotated a certain degree such that housing 1108 is tilted with respect to housing 1106 as shown in FIG. 11B. This can occur, for example, when the host device is a tablet and the accessory device is a keyboard accessory and that the tablet is tilted so that the screen is angled upward toward a user's face.

FIG. 11B illustrates a cross-sectional view along the dotted cut line through inductive interconnection system 1100 shown in of FIG. 11A, according to some embodiments of the present disclosure. When housing 1108 is rotated at an angle 1109 with respect to housing 1106 around pivot point 1112, respective transmitting and receiving elements 1102 and 1104 are correspondingly rotated along angle 1109. Accordingly, transmitting element 1102 can be disposed a rotational separation distance 1110 away from receiving element 1104. The rotation causes a greater net separation between transmitting and receiving element 1102 and 1104 than if no rotation is present. Thus, in some instances, rotational separation distance 1110 can be greater than separation distance 508 discussed herein with respect to FIG. 5 even though the distance between the very bottom corner of transmitting element 1102 and receiving element 1104 may be substantially the same as distance 508. The degree of inductive coupling between transmitting and receiving elements can thus depend on at least two factors: separation distance and rotational angle, as shown in FIG. 11C.

Figure 11C:
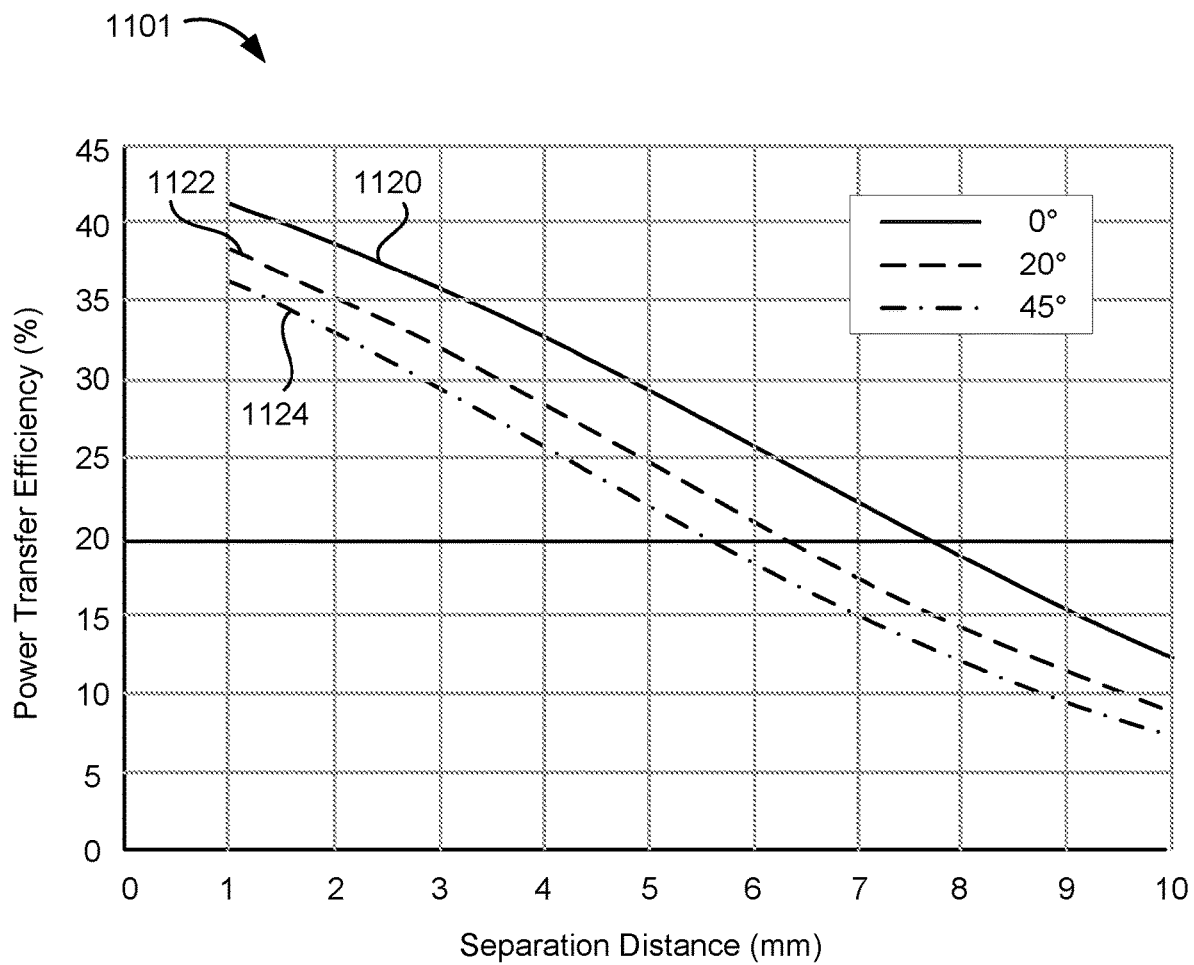
FIG. 11C is a graph illustrating a degree of power transfer efficiency between transmitting and receiving elements with respect to varying both separation distance and rotational angle, according to some embodiments of the present disclosure.

FIG. 11C is a graph 1101 illustrating a degree of power transfer efficiency between transmitting and receiving elements with respect to varying both separation distance and rotational angle. Graph 1101 has a y-axis representing a degree of power transfer efficiency in percentages increasing upwards, and an x-axis representing a degree of separation distance in millimeters increasing to the right. Three plots are shown in graph 1101, each representing a different degree of angular rotation: plot 1120 representing a 0° angular rotation, plot 1122 representing a 20° angular rotation, and plot 1124 representing a 45° angular rotation.

As shown in graph 1101, percentage of power transfer efficiency decreases as separation distance increases. Graph 1101 further shows that as angular rotation increases, power transfer efficiency decreases further across all separation distances. Thus, the losses of inductive coupling caused by angular rotation adds to the losses of inductive coupling caused by separation distance. However, it is to be appreciated that embodiments herein can still enable sufficient power transfer even with a degree of angular rotation. For instance, if the power transfer efficiency threshold for sufficient wireless power transfer between a transmitting element and a receiving element is 20% power transfer efficiency, then successful power transfer can still be achieved by an inductive interconnection system whose separation distance is less than 5.5 mm and whose angular rotation is less than 45°. These limits however are merely exemplary and that they can change depending on desired power transfer efficiency.

Disclosures aforementioned herein discuss angular rotation around a single pivot point, e.g., pivot point 1112 in FIG. 11B; however, embodiments are not limited to configurations that can only pivot round one pivot point. Some embodiments can pivot across any point along an elongated receiving element, as discussed herein with respect to FIGS. 12A and 12B.

Figure 12A:
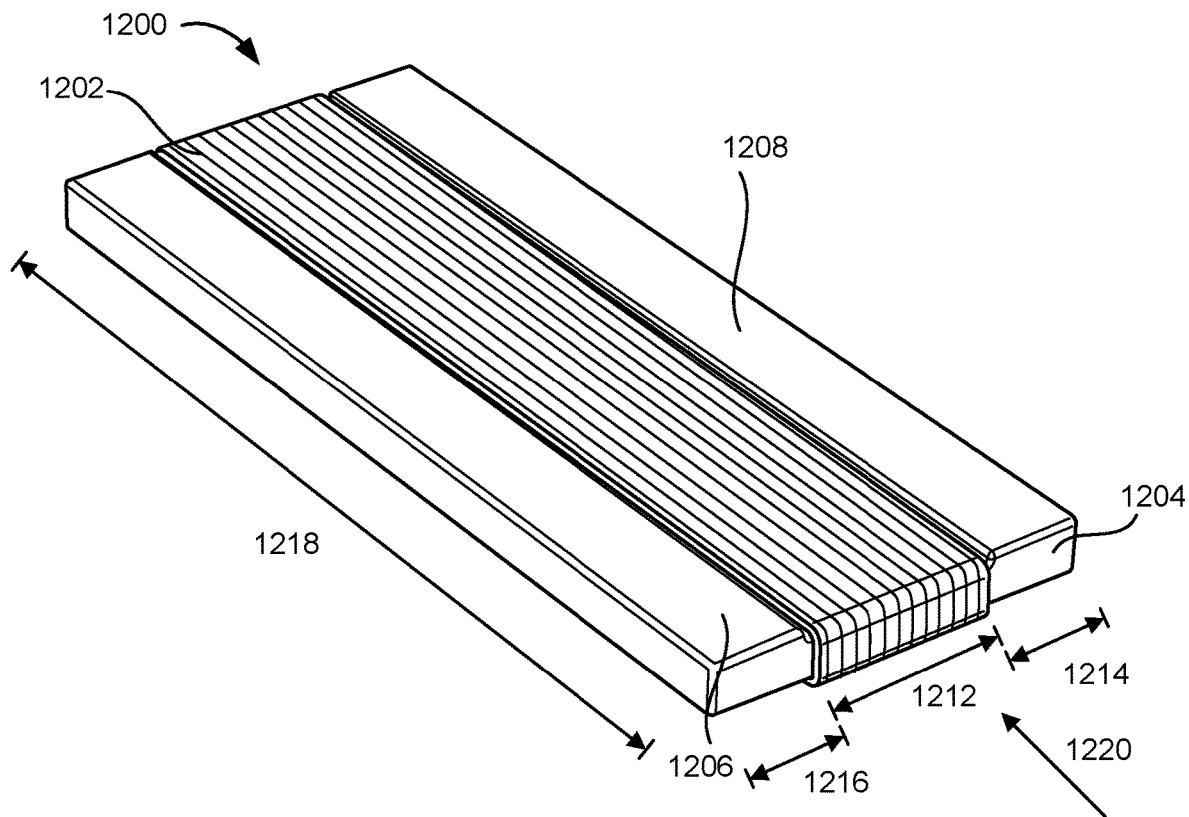
FIG. 12A is a perspective view illustrating an elongated receiving element, according to some embodiments of the present disclosure.

FIG. 12A is a perspective view illustrating an elongated receiving element 1200, according to some embodiments of the present disclosure. In some embodiments, elongated receiving element 1200 can have substantial similarities to transmitting element 200 discussed herein with respect to FIG. 2A. For example, elongated receiving element 1200 can include a ferromagnetic structure 1204 and a coil 1202 wound about a central portion 1212 of ferromagnetic structure 1204. Ferromagnetic structure can also include end regions 1214 and 1216 that protrude past a side surface (not shown, but positioned similarly to surface 210 in FIG. 2A) and have interfacing surfaces 1206 and 1208. Thus, when elongated receiving element 1200 is observed from direction 1220, the observed structure is substantially similar to receiving element 400 in FIG. 4, which is substantially similar to transmitting element 200 of FIG. 2A. However, elongated receiving element 1200 can include a substantially greater height 1218 than height $Z_{TX}$ of transmitting element 200 in FIG. 2A. In some embodiments, height 1218 is greater than the widths of central portion 1212 and end regions 1214 and 1216 combined. The greater height allows a receiving element to receive power from any point along height 1218, thereby providing a larger area at which receiving element can be positioned to receive charge.

Figure 12B:
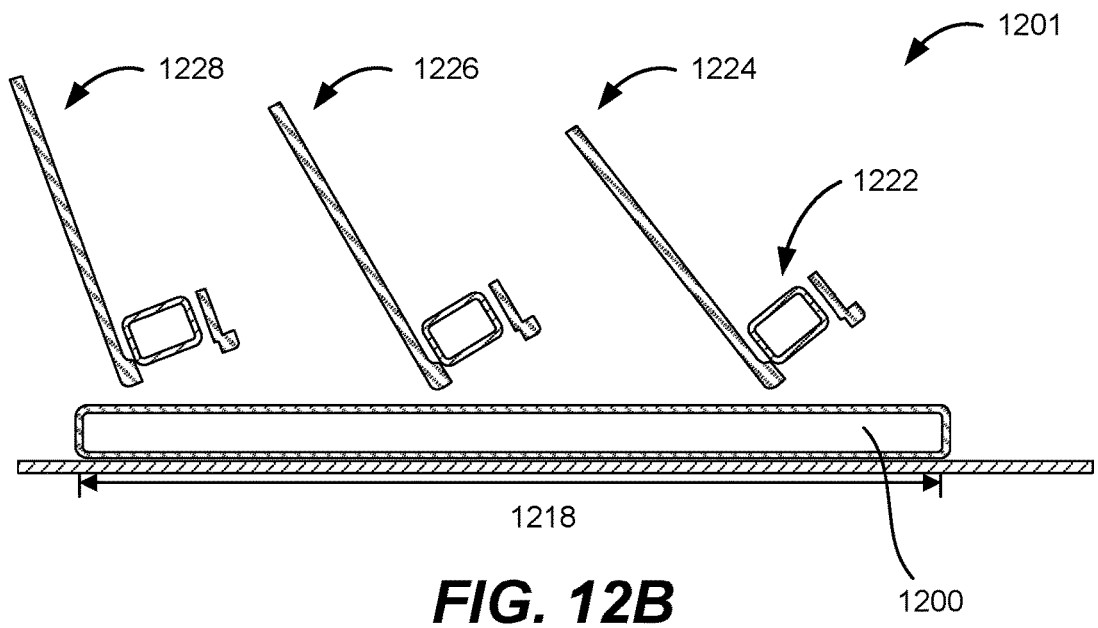
FIG. 12B illustrates an exemplary inductive interconnection system including an elongated receiving element, according to some embodiments of the present disclosure.

For instance, FIG. 12B illustrates an exemplary inductive interconnection system 1201 including elongated receiving element 1200, according to some embodiments of the present disclosure. Elongated receiving element 1200 can wirelessly receive a sufficient amount of power from transmitting element 1222 when transmitting element 1222 is positioned along any point across height 1218. As an example, elongated receiving element 1200 can receive power from transmitting element 1222 when it is positioned at any one of points 1224, 1226, and 1228.

2. Receiving Element Enabling 360° Rotation

As discussed with respect to the aforementioned figures, a receiving element can be configured to receive power from a transmitting element in a limited range of angular rotation. However, as will be discussed further herein with the following figures, a receiving element can be configured to receive power from a transmitting element at any point along a complete 360° range of angular rotation, according to some embodiments of the present disclosure. Accordingly, an accessory device within which the receiving element is disposed can receive power from a host device regardless of how the receiving element is rotated along its axis. This enables the accessory device to be easily placed against the host device to receive power, thereby substantially enhancing user experience.

Figure 13A:
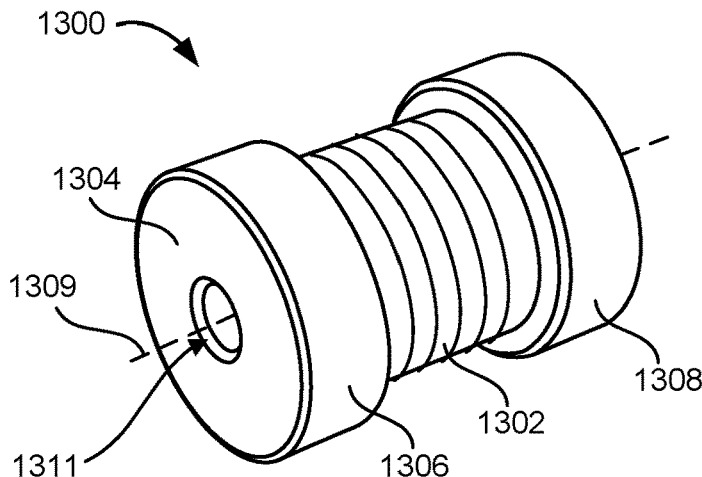
FIGS. 13A-13C illustrate perspective and plan views of an exemplary transmitting element capable of receiving power from any position across a 360° of angular rotation, according to some embodiments of the present disclosure.
Figure 13B:
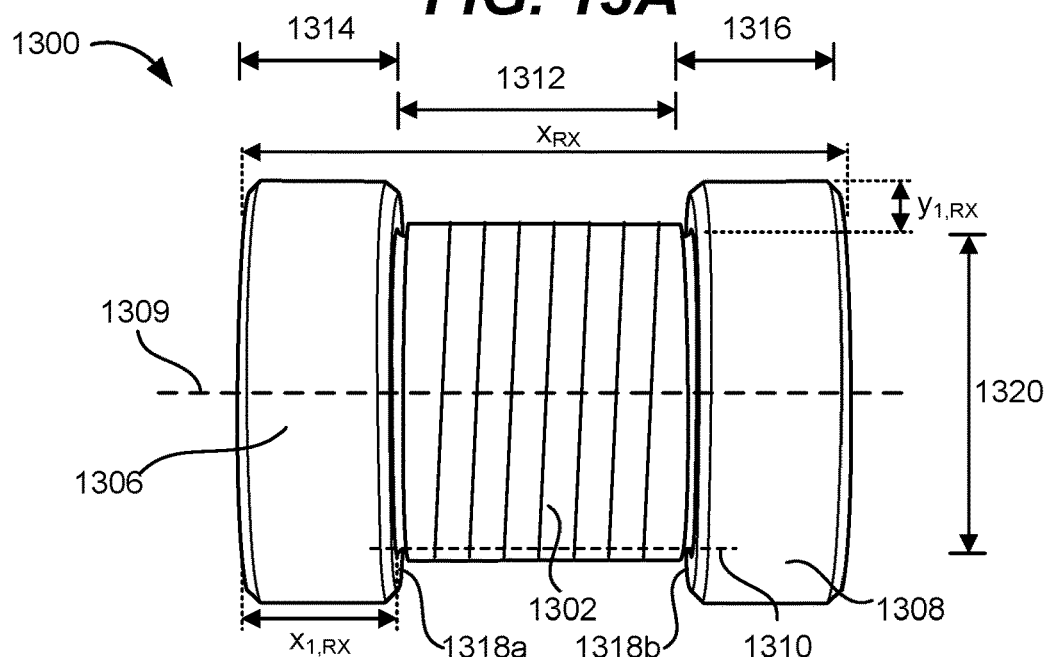
Figure 13C:
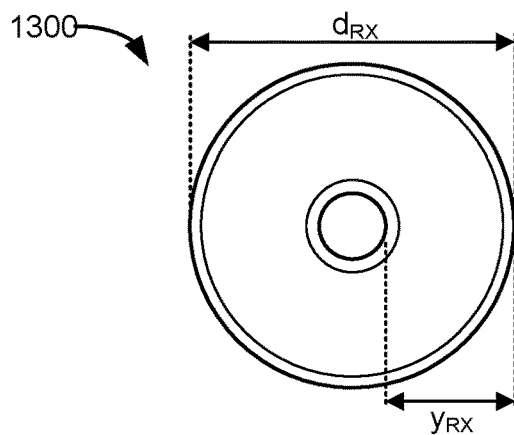

FIGS. 13A-13C illustrate perspective and plan views of an exemplary receiving element 1300 capable of receiving power from any position across a 360° of angular rotation, according to some embodiments of the present disclosure. Specifically, FIG. 13A illustrates a perspective view of receiving element 1300, FIG. 13B illustrates a top-down view of receiving element 1300, and FIG. 13C illustrates a side-view of receiving element 1300, according to some embodiments of the present disclosure.

With reference to FIG. 13A, receiving element 1300 can include a coil 1302 and a ferromagnetic structure 1304. Coil 1302 can be a conductive strand of wire that is wound about a portion of ferromagnetic structure 1304. When wound, coil 1302 forms an inductor coil that can generate time-vary magnetic flux when current is driven through coil 1302. Ferromagnetic structure 1304 can be a structure that can redirect the propagation of magnetic flux. For instance, ferromagnetic structure 1304 can be formed of a magnetic material including ferrite, such as MnZn.

Because the magnetic properties of ferromagnetic structure 1304 can redirect the magnetic flux generated by coil 1302 through its body, ferromagnetic structure 1304 can be configured to guide the magnetic flux toward all directions in a 360° manner based upon its structural design. For instance, unlike the rectangular block-like structure of receiving element 400 in FIG. 4A, receiving element 1300 can be substantially cylindrical in form. In some embodiments, receiving element 1300 can be symmetrical about a central axis 209 disposed along a length of ferromagnetic structure 1304. A channel 1311 can be positioned along central axis 209 and provide vacant space through which objects, such as wires, cables, and the like, can tunnel. Receiving element 1300 can include interfacing surfaces 1306 and 1308 that are positioned past an outer surface of a groove region of ferromagnetic structure 1304. A better illustration of the structural configuration of receiving element 1300 is shown in the top-down view of FIG. 13B.

As shown in FIG. 13B, receiving element 1300 can include a groove region 1312 defining two end regions 1314 and 1316 positioned on opposing sides of groove region 1312. Coil 1302 can be wound around groove region 1312 and between (but not around) end regions 1314 and 1316. As mentioned herein, receiving element 1300 can include two interfacing surfaces 1306 and 1308, which can be respective surfaces of end regions 1314 and 1316 that are positioned the same distance away from central axis 1309. Interfacing surfaces 1306 and 1308 can be axially symmetrical around central axis 1309 so that it is substantially annular in shape. End regions 1314 and 1316 can protrude past a surface 1310 of groove region 1312 such that interfacing surfaces 1306 and 1308 are disposed a distance $Y_{1,RX}$ away from surface 1310. As can be noticed in FIG. 13B, surface 1310 is hidden behind coil 1302 but is represented by a dashed line for clarity. In some embodiments, surface 1310 can be connected to interfacing surfaces 1306 and 1308 by sidewalls 1318a and 1318b. Thus, sidewalls 1318a and 1318b can be disposed between groove region 1312 and end regions 1314 and 1316. Sidewalls 1318a and 1318b can extend a distance $Y_{1,RX}$, which can be selected to be any suitable distance greater than or equal to a thickness of coil 1302. For instance, $Y_{1,RX}$ can be between 0.5 and 1.5 mm, such as 1 mm in a particular embodiment. In some embodiments, end regions 1314 and 1316 can be in the shape of flanges that flare outward from central axis 1309. As can be seen in FIG. 13B, the overall structure of receiving element 1300 can have a strong resemblance to the structure of a bobbin.

In some embodiments, receiving element 1300 can have an overall width $X_{RX}$ and an overall diameter $d_{RX}$. Additionally, end regions 1314 and 1316 can have a width $X_{1,RX}$. Dimensions $X_{RX}$, $Y_{RX}$, and $X_{1,RX}$ can be selected according to design. For instance, dimensions $X_{RX}$, $Y_{RX}$, and $X_{1,RX}$ can be selected to achieve a certain degree of inductive coupling between receiving element 1300 and a transmitting element, while resulting in an overall size that can fit within space constraints of a housing for an accessory device. In some instances, widths $X_{RX}$ and $X_{1,RX}$ are selected to be equal to the corresponding widths of the transmitting element for efficient power transfer. Width $X_{RX}$ can range between 10 mm and 80 mm, width $X_{1,RX}$ can range between 3 mm and 4 mm, and length $Y_{RX}$ can range between 3 mm and 4 mm.

Furthermore, as shown in the side-view perspective of receiving element 1300 in FIG. 13C, receiving element 1300 can also have a length $d_{RX}$ and a radial thickness $y_{RX}$. Length $d_{RX}$ can also be defined as the diameter of receiving element 1300. In some embodiments, length $d_{RX}$ and radial thickness $y_{RX}$ are also selected to achieve a certain degree of inductive coupling between receiving element 1300 and a receiving element, while resulting in an overall size that can fit within space constraints of a housing for an accessory device. In particular embodiments, $d_{RX}$ can range between 7 and 8 mm, and radial thickness $y_{RX}$ can range between 3 and 4 mm. In some embodiments, radial thickness $y_{RX}$ can be equal to the overall length $Y_{TX}$ of the transmitter coil from which it receives power, an example of which can be referenced in FIG. 2A. In some further embodiments, groove region 1312 in FIG. 13B can have a length 1320 that is defined by the difference between length $Y_{1,RX}$ and $d_{RX}$. Thus, length 1320 of groove region 1312 can be less than length $d_{RX}$ in particular embodiments. Accordingly, groove region 1312 can have a smaller length than end regions 1316 and 1316.

It is to be appreciated that end regions 1314 and 1316 can protrude away from, and in an orientation perpendicular to, central axis 1309, and around the entire circumference of receiving element 1300. Thus, end regions 1314 and 1316 can protrude continuously around central axis 1309. According to embodiments of the present disclosure, this enables receiving element 1300 to receive power from a transmitting element in any rotational orientation around central axis 1309, as will be discussed further herein with respect to FIGS. 14A-14C.

Figure 14A:
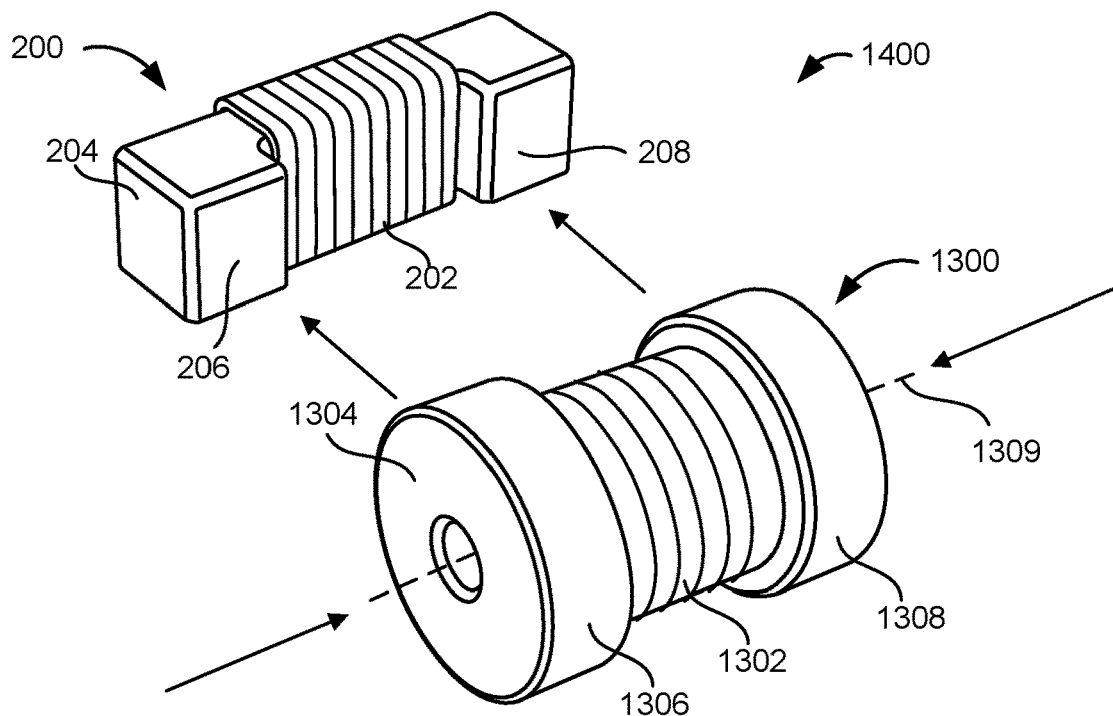
FIG. 14A illustrates a perspective view of an inductive interconnection system whose receiving element is moving into position to receive power from a transmitting element, according to some embodiments of the present disclosure.

FIG. 14A illustrates a perspective view of an inductive interconnection system 1400 whose receiving element 1300 is moving into position to receive power from transmitting element 200, according to some embodiments of the present disclosure. As mentioned herein with respect to FIG. 2A, transmitting element 200 can include coil 202 wound about a central portion of ferromagnetic structure 204, which has interfacing surfaces 206 and 208. To receive power, receiving element 1300 can be moved toward and into alignment with transmitting element 200 such that interfacing surfaces 1306 and 1308 of receiving element 1300 are positioned proximate to respective interfacing surfaces 206 and 208 of transmitting element 200.

Figure 14B:
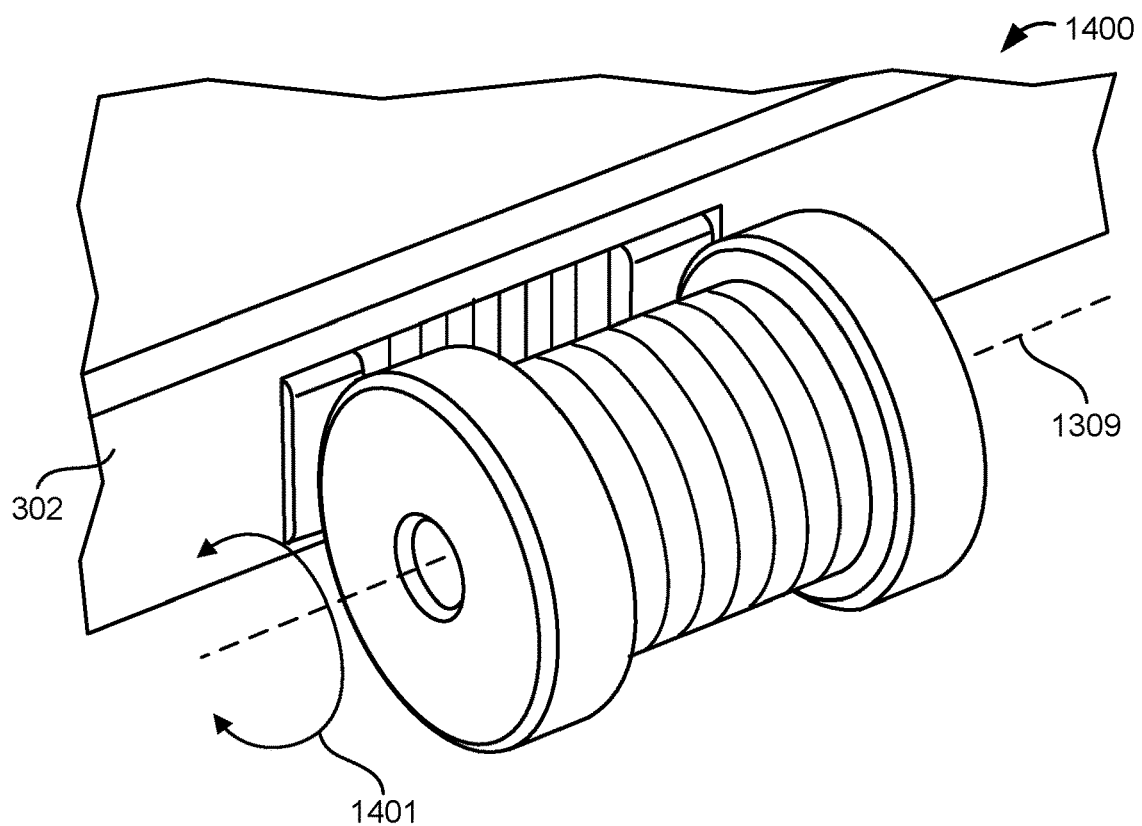
FIG. 14B illustrates an inductive interconnection system when a receiving element is aligned with a transmitting element to receive power, according to some embodiments of the present disclosure.

FIG. 14B illustrates inductive interconnection system 1400 when receiving element 1300 is aligned with transmitting element 200 to receive power, according to some embodiments of the present disclosure. Transmitting element 200 is shown as being housed within housing 302, as discussed herein with respect to FIG. 3, which can be a housing for any suitable portable electronic device (e.g., a tablet computer, a smart phone, a laptop computer, and the like). When aligned, coil 202 can generate time-varying magnetic flux that can induce a corresponding current in coil 1302 regardless of how receiving element 1300 is rotated along rotational pathway 1401 around central axis 1309. This is because receiving element 1300 is axially symmetrical around central axis 1309 so that no matter how receiving element 1300 is rotated around central axis 1309, the electrical interactions between it and transmitting element 200 are not impacted and can continue to transfer power. A better illustration of this concept is shown in FIG. 14C.

Figure 14C:
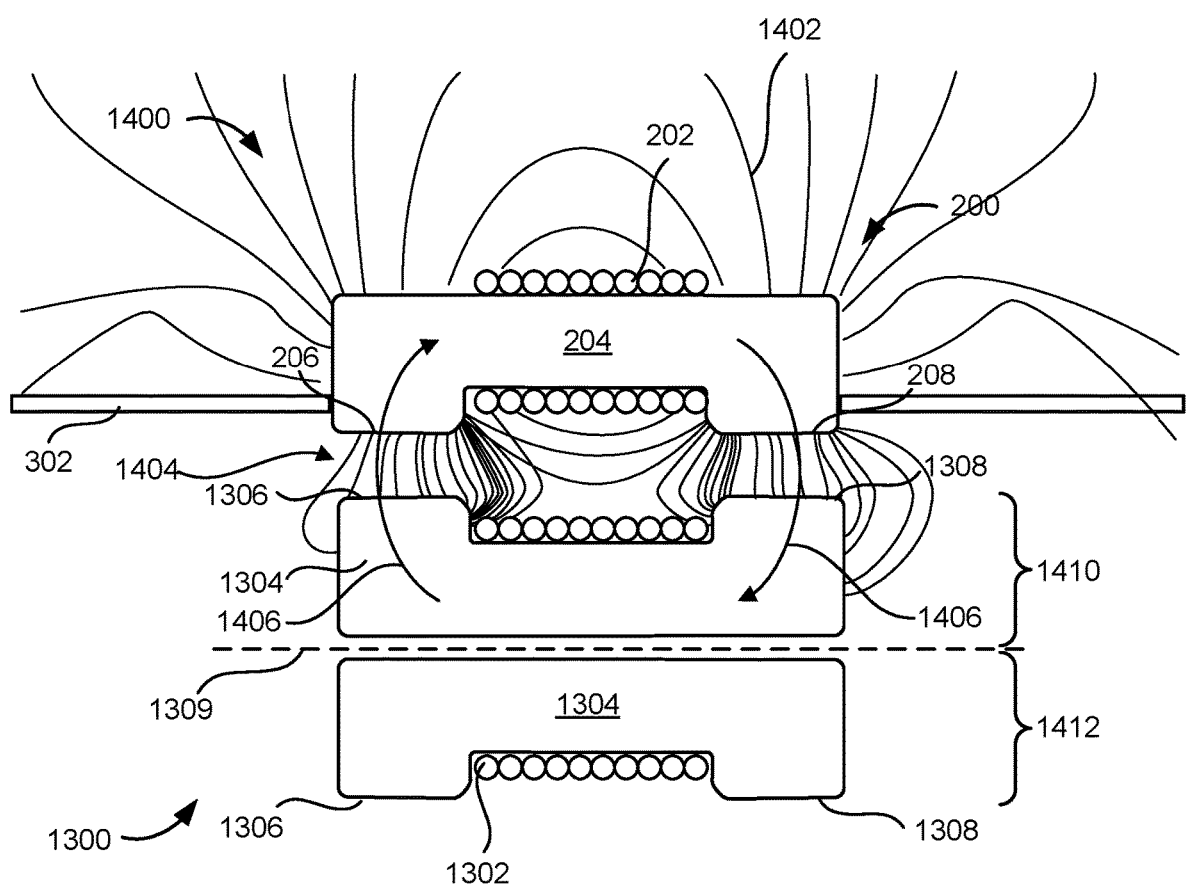
FIG. 14C illustrates a cross-sectional view of an inductive interconnection system showing exemplary magnetic interactions between a transmitting element and a receiving element during wireless power transfer, according to some embodiments of the present disclosure.

FIG. 14C illustrates a cross-sectional view of inductive interconnection system 1400 showing exemplary magnetic interactions between transmitting element 200 and receiving element 1300 during wireless power transfer, according to some embodiments of the present disclosure. Transmitting element 200 is shown as being housed within housing 302. As can be appreciated by the illustration shown in FIG. 14C, central axis 1309 can divide receiving element 1300 in two halves: a first half 1410 and a second half 1412. First half 1410 positioned closest to transmitting element 200 can have a cross section that is substantially similar to receiving element 400 in FIGS. 4 and 5. Thus, the electrical interactions during wireless power transfer are substantially similar. For instance, during wireless power transfer, coil 202 can generate a plethora of time-varying magnetic flux 1402, a substantial portion of which can be redirected by ferromagnetic structure 204 so that the flux exits or enters through interfacing surfaces 208 and 206 and enters or exits ferromagnetic structure 1304 through interfacing surfaces 1306 and 1308. Thus, a concentration of magnetic flux 1402 can exist in regions 1404 between corresponding interfacing surfaces/rings of ferromagnetic structures 204 and 1304. In some embodiments, surfaces of interfacing surfaces 1306 and 1308 are parallel to central axis 1309.

Furthermore, depending on the direction of current flowing through coil 202, a substantial amount of magnetic flux 1402 generated by coil 202 can first flow out of interfacing surface 208 and into interfacing surface 1308 of ferromagnetic structure 1304, which can then propagate through ferromagnetic structure 1304 and exit out of interfacing surface 1306 so that magnetic flux 1402 can enter back into ferromagnetic structure 204 through interfacing surface 206. The resulting flow magnetic flux forms a magnetic loop 1406 that induces a current in coil 1302 that can be used to provide power to an accessory device within which receiving element 1300 is disposed. Although magnetic loop 1406 is shown in a clockwise direction, magnetic loop 1406 can also propagate in a counter-clockwise direction when current is flowing through coil 202 in an opposite direction. It is to be appreciated that because receiving element 1300 is symmetrical around central axis 1309, second half 1412 can be identical to first half 1410 but just arranged in a mirror image of first half 1410. Thus, if receiving element 1300 is rotated round central axis 1309, the half closest to transmitting element 200 will be identical to first half 1410 as shown in FIG. 14C and have the same electrical interactions. As such, receiving element 1300 can receive power regardless of how it is rotated around central axis 1309, thereby substantially increasing the ease at which receiving element 1300 can receive power from transmitting element 200.

Although FIG. 14C illustrates transmitting element 200 as transmitting power to receiving element 1300, embodiments are not so limited. Other embodiments can reverse the transfer of power such that transmitting element 200 receives power from receiving element 1300. As an example, current can be driven into coil 1302 of receiving element 1300 such that coil 1302 generates time-varying magnetic flux. The generated time-varying magnetic flux can be redirected by ferromagnetic structure 1304, which can be received by ferromagnetic structure 1304. The received magnetic flux in ferromagnetic structure 1304 can induce a corresponding current in coil 1302, which can be used to provide power to a host device within which transmitting element 200 is disposed.

III. Alignment Devices for Inductive Interconnection Systems

As can be understood by the disclosures herein, efficient power transfer is achieved when a receiving element in an accessory device is aligned with a transmitting element in a host device. To achieve alignment between the two elements, one or more alignment devices can be implemented. However, when the receiving element is substantially symmetrical about its central axis, e.g., receiving element 1300 in FIG. 13A, and housed within a housing of an accessory device that is also substantially symmetrical about its central axis, e.g., a stylus, smart pencil, and the like, then the alignment device for the accessory device may also need to be able to align the receiving element with the transmitting element in any degree of angular rotation. According to some embodiments of the present disclosure, one or more alignment devices can be implemented in the host device and the accessory device to enable the accessory device to align with the host device at any point along a complete 360° range of angular rotation.

Figure 15:
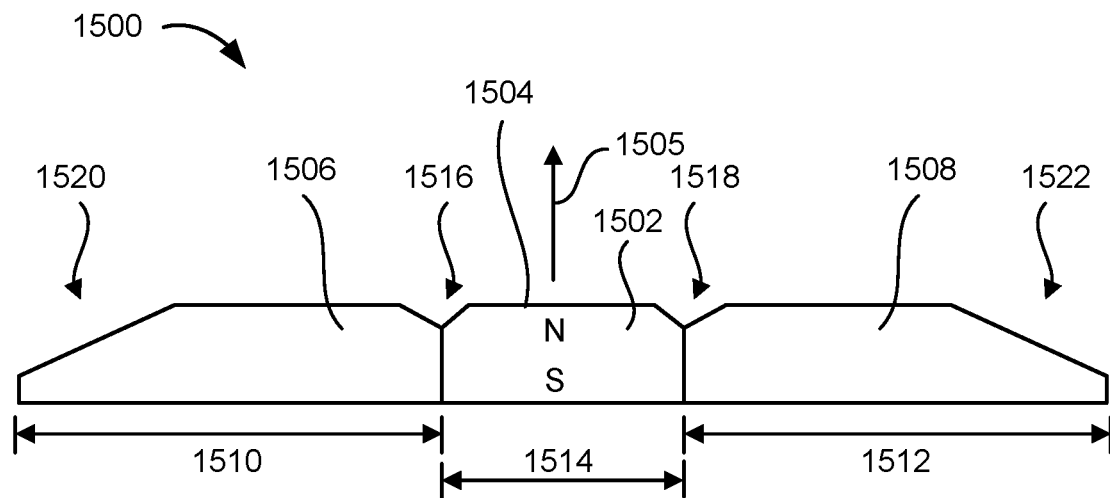
FIG. 15 is a simplified illustration of an exemplary host alignment device for a host device having a single center magnet, according to some embodiments of the present disclosure.

FIG. 15 is a simplified illustration of an exemplary host alignment device 1500 for a host device having a single center magnet 1502, according to some embodiments of the present disclosure. Host alignment device 1500 can be housed within the host device to align an accessory device to the host device by aligning to an accessory alignment device in the accessory device. Center magnet 1502 can be any suitable permanent magnet, such as a neodymium magnet. Host alignment device 1500 can have an interfacing surface 1504 that is directed toward the accessory alignment device to attract the accessory alignment device, as will be discussed further herein. In some embodiments, center magnet 1502 can be arranged such that its magnetic poles are positioned vertically, meaning that its north and south pole are positioned along a vertical axis. For instance, as shown in FIG. 15, center magnet 1502 can have a north pole positioned at interfacing surface 1504 so that magnetic flux 1505 is directed outward to attract an accessory alignment device that has a corresponding south pole.

According to some embodiments, center magnet 1502 can be positioned between two ferromagnetic structures 1506 and 1508. Ferromagnetic structures 1506 and 1508 are not permanent magnets, but are structures formed of ferromagnetic material through which magnetic flux is allowed to propagate. As an example, ferromagnetic structures 1506 and 1508 can be formed of ferritic stainless steel, iron, nickel, cobalt, or any other suitable material. In some embodiments, ferromagnetic structures 1506 and 1508 have widths 1510 and 1512 that are larger than a width 1514 of center magnet 1502. Having wider ferromagnetic structures 1506 and 1508 can allow magnetic flux to propagate farther away from center magnet 1502 so that magnetic flux is not concentrated in regions immediately beside center magnet 1502, thereby smoothing the force profile as an accessory alignment device is moved in that region, as will be discussed further herein with respect to FIGS. 18-19.

With further reference to FIG. 15, host alignment device 1500 can also include chamfered regions 1516 and 1518 positioned at the interfaces of center magnet 1502 and both ferromagnetic structures 1506 and 1508. In some embodiments, chamfered regions 1516 and 1518 are sloped surfaces that form a V-shape where the lowest end of the sloped surfaces are positioned at the interface between center magnet 1502 and both ferromagnetic structures 1506 and 1508. Chamfered regions 1516 and 1518 can enlarge the separation distance between the top corners of center magnet 1502 and both ferromagnetic structures 1506 and 1508 to decrease the strength of the magnetic flux at chamfered regions 1516 and 1518 as well as minimize magnetic flux leakage due to a high concentration of magnetic flux that would exist at those regions if no chamfering existed. By decreasing the magnetic flux strength of chamfered regions 1516 and 1518, the force profile exerted on an accessory alignment device as it moves into alignment with host alignment device 1500 can be smoothed, as will be discussed further herein. Furthermore, by minimizing magnetic flux leakage at chamfered regions 1516 and 1518, magnetically sensitive devices can be brought close to host alignment device 1500 without suffering from a negative interaction. For instance, minimizing magnetic flux leakage can prevent a credit card from being demagnetized when it is inadvertently brought close to host alignment device 1500.

In some embodiments, host alignment device 1500 can include outer chamfered edges 1520 and 1522 for further smoothing the force profile exerted on an accessory alignment device. For instance, outer chamfered edges 1520 and 1522 can slope downwards away from center magnet 1502 so that as an accessory alignment device moves toward center magnet 1502, the attractive force on the accessory alignment device gradually builds up. If outer chamfered edges 1520 and 1522 did not exist, then magnetic flux propagating out of ferromagnetic structures 1506 and 1508 may dramatically begin attracting the accessory alignment device as it moves close to ferromagnetic structures 1506 and 1508. According to some embodiments of the present disclosure, one or more strengthening magnets can be implemented in a host alignment device to enhance the strength of magnetic attraction with an accessory alignment device, as discussed herein with respect to FIG. 16.

Figure 16:
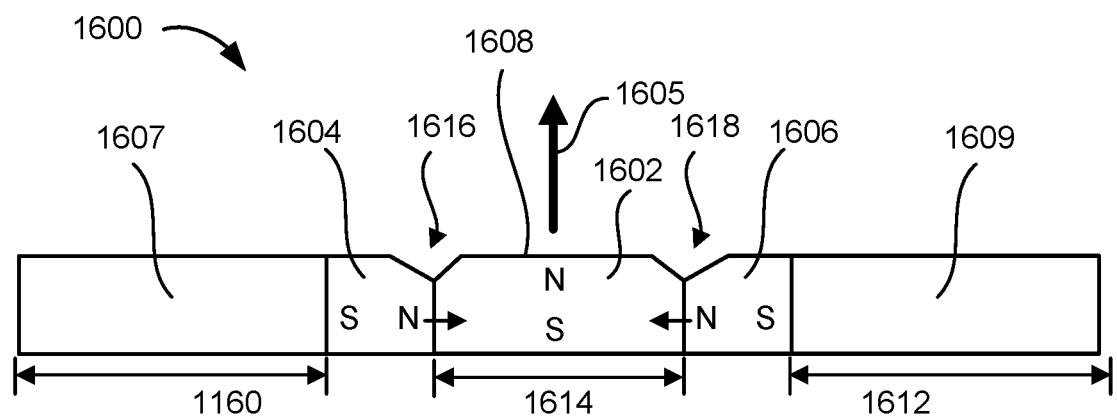
FIG. 16 is a simplified illustration of an exemplary host alignment device having a center magnet and two strengthening magnets, according to some embodiments of the present disclosure.

FIG. 16 is a simplified illustration of an exemplary host alignment device 1600 for a host device having a center magnet 1602 and two strengthening magnets 1604 and 1606, according to some embodiments of the present disclosure. Host alignment device 1500 can be housed within the host device to align an accessory device to the host device by aligning to an accessory alignment device in the accessory device. Alignment device 1600 can have an interfacing surface 1608 that is directed toward the accessory alignment device to attract the accessory alignment device, as will be discussed further herein. Similar to center magnet 1502, center magnet 1602 can be arranged such that its magnetic poles are positioned vertically, meaning that its north and south poles are positioned along a vertical axis. For instance, as shown in FIG. 16, center magnet 1602 can have a north pole positioned at interfacing surface 1608 so that magnetic flux 1605 is directed outward to attract an accessory alignment device that has a corresponding south pole.

However, unlike host alignment device 1500, host alignment device 1600 can include two strengthening magnets 1604 and 1606 on opposite sides of center magnet 1602.

Strengthening magnets 1604 and 1606 can be arranged such that their magnetic poles are positioned along a horizontal axis. Further, the orientation of the magnetic poles of strengthening magnets 1604 and 1606 can be arranged such that their magnetic flux aggregates and strengthens the magnetic flux generated by center magnet 1602. For instance, if center magnet is arranged such that its north pole is upwards and its south pole is downwards, strengthening magnet 1604 is arranged such that its north pole is on the right and its south pole is on the left, and strengthening magnet 1606 is arranged such that its north pole is on the left and its south pole is on the right. Accordingly, magnetic flux from strengthening magnets 1604 and 1606 can first propagate toward center magnet 1602 and then aggregate with magnetic flux generated by center magnet 1602 to provide a strengthened magnetic flux 1605 propagating upward toward an accessory alignment device. In some embodiments, strengthening magnets 1604 and 1606 have polarities that are opposite from each other so that magnetic flux from both magnets are either directed toward center magnet 1602 or away from center magnet 1602. Accordingly, the poles of strengthening magnets that are positioned beside center magnet 1602 can be the same pole as the pole of center magnet 1602 that is oriented upward in the direction of an accessory alignment device.

According to some embodiments, center magnet 1602 and strengthening magnets 1604 and 1606 are positioned between two ferromagnetic structures 1607 and 1609. For instance, strengthening magnet 1604 can be positioned between ferromagnetic structure 1607 and center magnet 1602, and strengthening magnet 1606 can be positioned between ferromagnetic structure 1609 and center magnet 1602. Ferromagnetic structures 1607 and 1609 can be substantially similar to ferromagnetic structures 1506 and 1508 in FIG. 15 in form and function. Thus, ferromagnetic structures 1607 and 1609 are structures formed of ferromagnetic material through which magnetic flux is allowed to propagate, and have widths 161160 and 1612 that are larger than a width 1614 of center magnet 1602. Having wider ferromagnetic structures 1607 and 1609 can allow magnetic flux to propagate farther away from strengthening magnets 1604 and 1606 so that magnetic flux is not concentrated in regions immediately beside strengthening magnets 1604 and 1606, thereby smoothing the force profile as an accessory alignment device is moved in that region, as will be discussed further herein with respect to FIGS. 18-19.

With further reference to FIG. 16, host alignment device 1600 can also include chamfered regions 1616 and 1618 positioned at the interfaces of center magnet 1502 and both strengthening magnets 1604 and 1606. Similar to chamfered regions 1516 and 1518, chamfered regions 1616 and 1618 can decrease the strength of the magnetic flux at chamfered regions 1616 and 1618 as well as minimize magnetic flux leakage due to a high concentration of magnetic flux that would exist at those regions if no chamfering existed. Thus, the force profile exerted on an accessory alignment device as it moves into alignment with host alignment device 1500 can be smoothed, as will be discussed further herein. And, magnetically sensitive devices can be brought close to host alignment device 1600 without suffering from a negative interaction, as discussed herein with respect to FIG. 15.

FIGS. 15 and 16 illustrate center magnets 1502 and 1602 has having a north pole oriented upward and a south pole oriented downward; however, it is to be appreciated that embodiments are not limited to such configurations. Some embodiments can have center magnets 1502 and 1602 arranged in opposite polarities. In such instances, strengthening magnets 1604 and 1606 can also be arranged in opposite polarities.

Although host alignment device 1600 is not shown as having outer chamfered edges, like outer chamfered edges 1520 and 1522 in FIG. 15, it is to be appreciated that host alignment device 1600 can include outer chamfered edges in some embodiments for further smoothing the force profile exerted on an accessory alignment device.

Figure 17A:
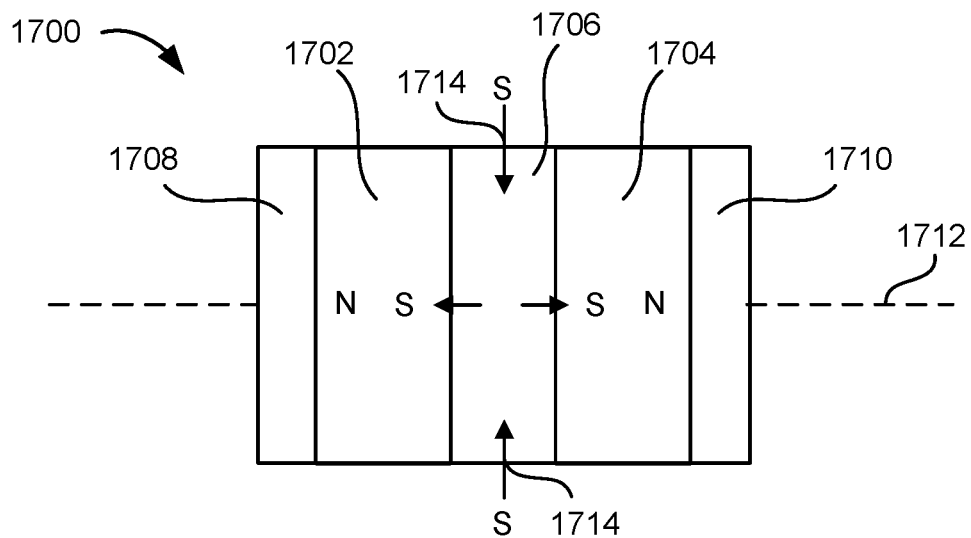
FIG. 17A illustrates an exemplary accessory alignment device that can be attracted to a host alignment device at any point along a complete 360° angular rotation, according to some embodiments of the present disclosure.

According to some embodiments of the present disclosure, an accessory alignment device can be configured to be attracted to the center magnet of a host alignment device at any point along a complete 360° angular rotation. FIG. 17A illustrates an exemplary accessory alignment device 1700 that can be attracted to a host alignment device at any point along a complete 360° angular rotation, according to some embodiments of the present disclosure. Accessory alignment device 1700 can include a pair of magnets 1702 and 1704 positioned between a center ferromagnetic structure 1706 and two side ferromagnetic structures 1028 and 1710. For instance, magnet 1702 can be positioned between center ferromagnetic structure 1706 and side ferromagnetic structure 1708, and magnet 1704 can be positioned between center ferromagnetic structure 1706 and side ferromagnetic structure 1710. Magnets 1702 and 1704 can be any suitable permanent magnets, e.g., neodymium magnets, and ferromagnetic structures 1706, 1708, and 1710 can be formed of any suitable ferromagnetic material, e.g., ferritic stainless steel, iron, nickel, cobalt, or any other suitable material.

Magnetic poles of magnets 1702 and 1704 can be arranged horizontally and oriented such that both of their magnetic flux propagate toward or away from center ferromagnetic structure 1706. Accordingly, their magnetic flux can aggregate and strengthen in center ferromagnetic structure 1706 and then propagate outward in all radial directions 1714 away from (or towards depending on polarity) its central axis 1712. For instance, magnets 1702 and 1704 can have their south poles oriented toward center ferromagnetic structure 1706 such that magnetic flux propagates toward central axis 1712 from all radial directions 1714. In some embodiments, accessory alignment device 1700 has a substantially cylindrical shape so that its structure is axially symmetrical with respect to central axis 1712. Thus, accessory alignment device 1700 can be attracted to any magnet having a north pole in any degree of rotation around its central axis 1712, as better shown in FIG. 17B.

Figure 17B:
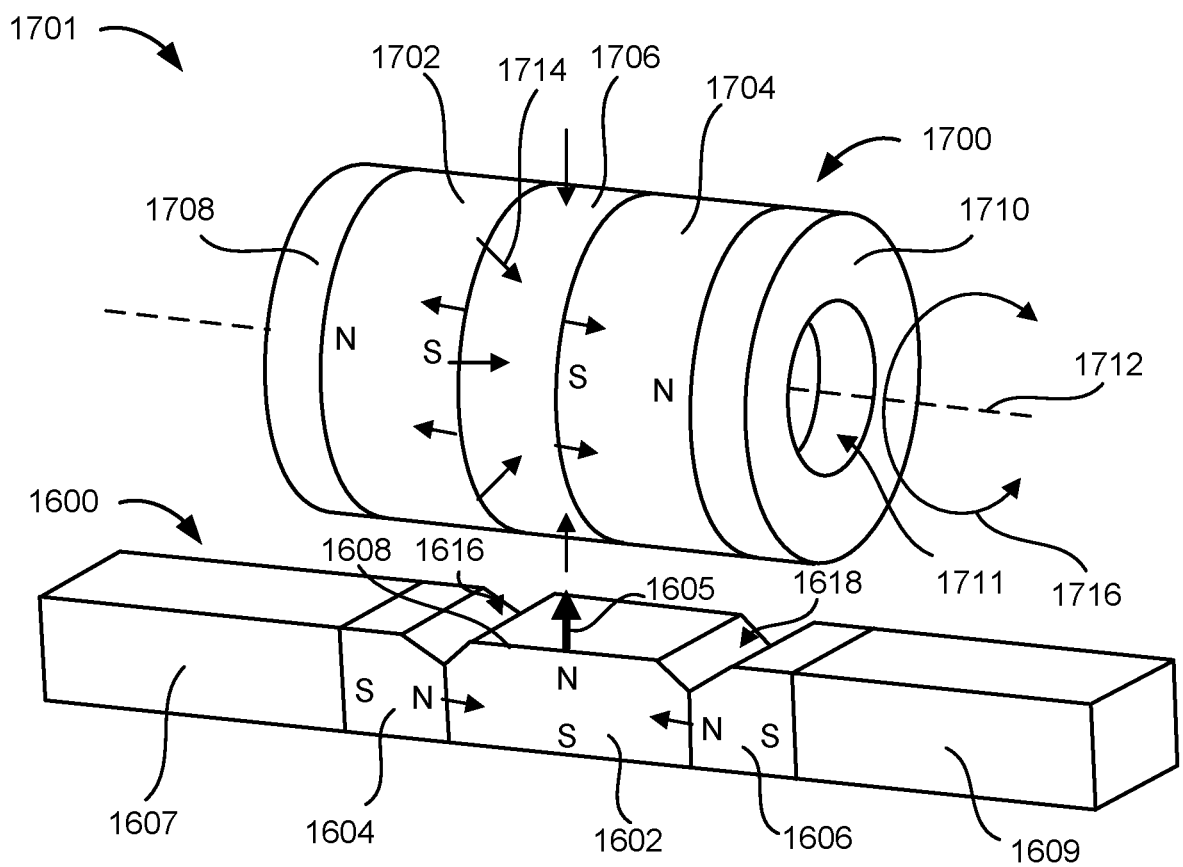
FIG. 17B illustrates an exemplary perspective view of an alignment system including an accessory alignment device and a host alignment device, according to some embodiments of the present disclosure.

FIG. 17B illustrates an exemplary perspective view of an alignment system 1701 including an accessory alignment device (e.g., accessory alignment device 1700) and a host alignment device (e.g., host alignment device 1600), according to some embodiments of the present disclosure. As shown in FIG. 17B, accessory alignment device 1700 is being attracted to host alignment device 1600. When accessory alignment device 1700 is brought close to host alignment device 1600, forces generated by complementary magnetic fluxes draw them toward alignment. For ease of understanding, the magnetic polarities discussed herein with respect to FIGS. 16 and 17A are also applied to FIG. 17B. During alignment, host alignment device 1600 has a strong north polarity at its interfacing surface 1608 that attracts the south polarity of center ferromagnetic structure 1706 of accessory alignment device 1700. The substantially axially symmetrical structure of accessory alignment device 1700 enables it to be attracted to host alignment device 1600 in any degree of rotation 1716 around its central axis 1712. In some embodiments, a channel 1711 can be positioned along central axis 1712 and provide vacant space through which objects, such as wires, cables, and the like, can tunnel.

As mentioned herein, accessory alignment device 1700 further includes side ferromagnetic structures 1708 and 1710. Side ferromagnetic structures 1708 and 1710 can help spread out the propagation of magnetic flux so that there is not a high concentration of magnetic flux at the interface between magnets 1702 and 1704. The spreading of magnetic flux by ferromagnetic structures 1708, 1710, 1607, and 1609 in conjunction with the chamfered edges 1616 and 1618 helps smooth the force profile of an attraction force between devices 1700 and 1600 such that the user feels a smooth attraction between them.

Figure 18:
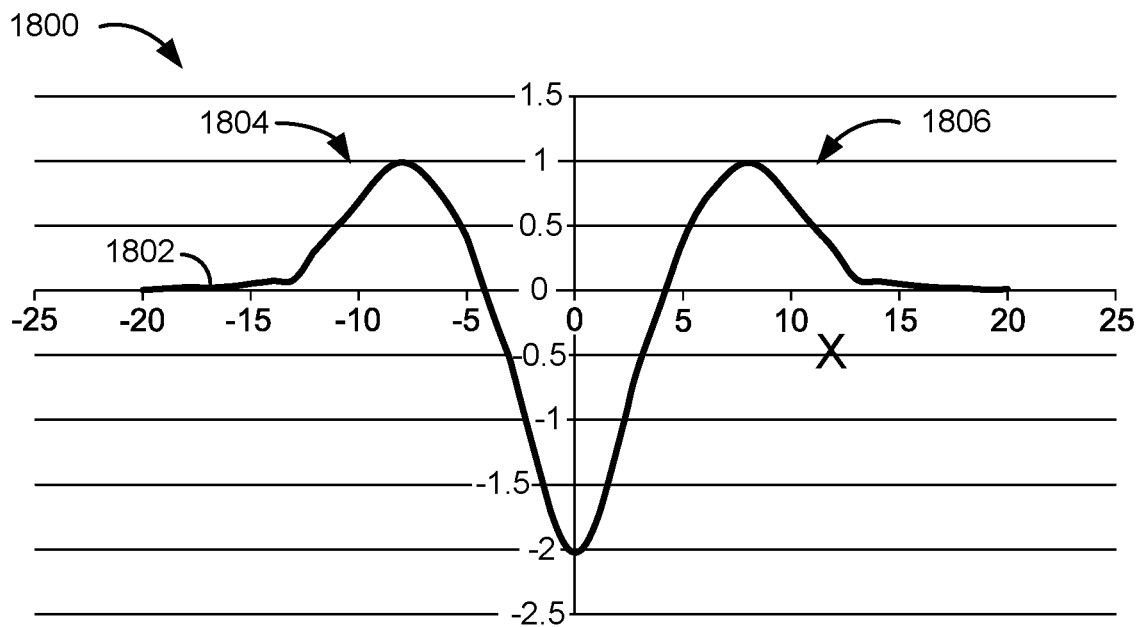
FIG. 18 is a graph illustrating a force profile between accessory and host alignment devices without chamfered edges.
Figure 19:
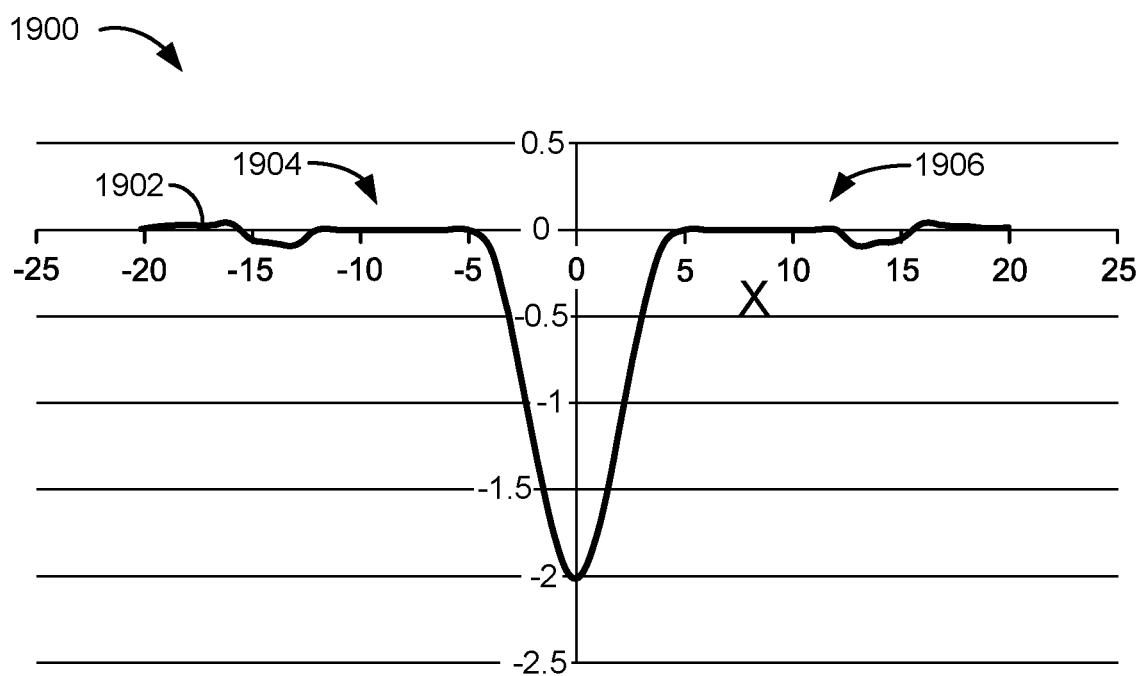
FIG. 19 is a graph illustrating a force profile between accessory and host alignment device with chamfered edges, according to some embodiments of the present disclosure.

FIGS. 18 and 19 are graphs illustrating exemplary force profiles between accessory and host alignment devices. Specifically, FIG. 18 is a graph illustrating a force profile 1802 between accessory and host alignment devices without chamfered edges (e.g., chamfered edges 1616 and 1618 in FIG. 17B), and FIG. 19 is a graph illustrating a force profile 1902 between accessory and host alignment devices with chamfered edges, according to some embodiments of the present disclosure. Both graphs have an x-axis representing a distance between the center of an accessory alignment device and the center of a host alignment device where 0 represents alignment. Both graphs also have a y-axis representing a degree of force where positive values indicate a repelling force and negative values indicate an attractive force.

As shown in FIG. 18, without the chamfered edges, force profile 1802 can include peaks 1804 and 1806 of high repelling forces experienced by a user. These peaks can be positioned at the interfaces between a center magnet (e.g., 1602 in FIGS. 16 and 17B) and both strengthening magnets (e.g., 1604 and 1606 in FIGS. 16 and 17B). Thus, the user will feel strong resistance as accessory alignment device 1700 moves toward the aligned position before feeling a strong attractive force as the two devices are aligned. In contrast, force profile 1902 as shown in FIG. 19 does not have peaks 1804 and 1806 but instead has flat regions 1904 and 1906 where the peaks would be if the host alignment device did not have chamfered edges. The chamfered edges reduce the concentration of magnetic flux at that area so a strong repelling force does not exist to repel the accessory alignment device at those locations. As a result of having chamfered regions, the force profile is substantially smoother, thereby resulting a better user feel.

Figure 20:
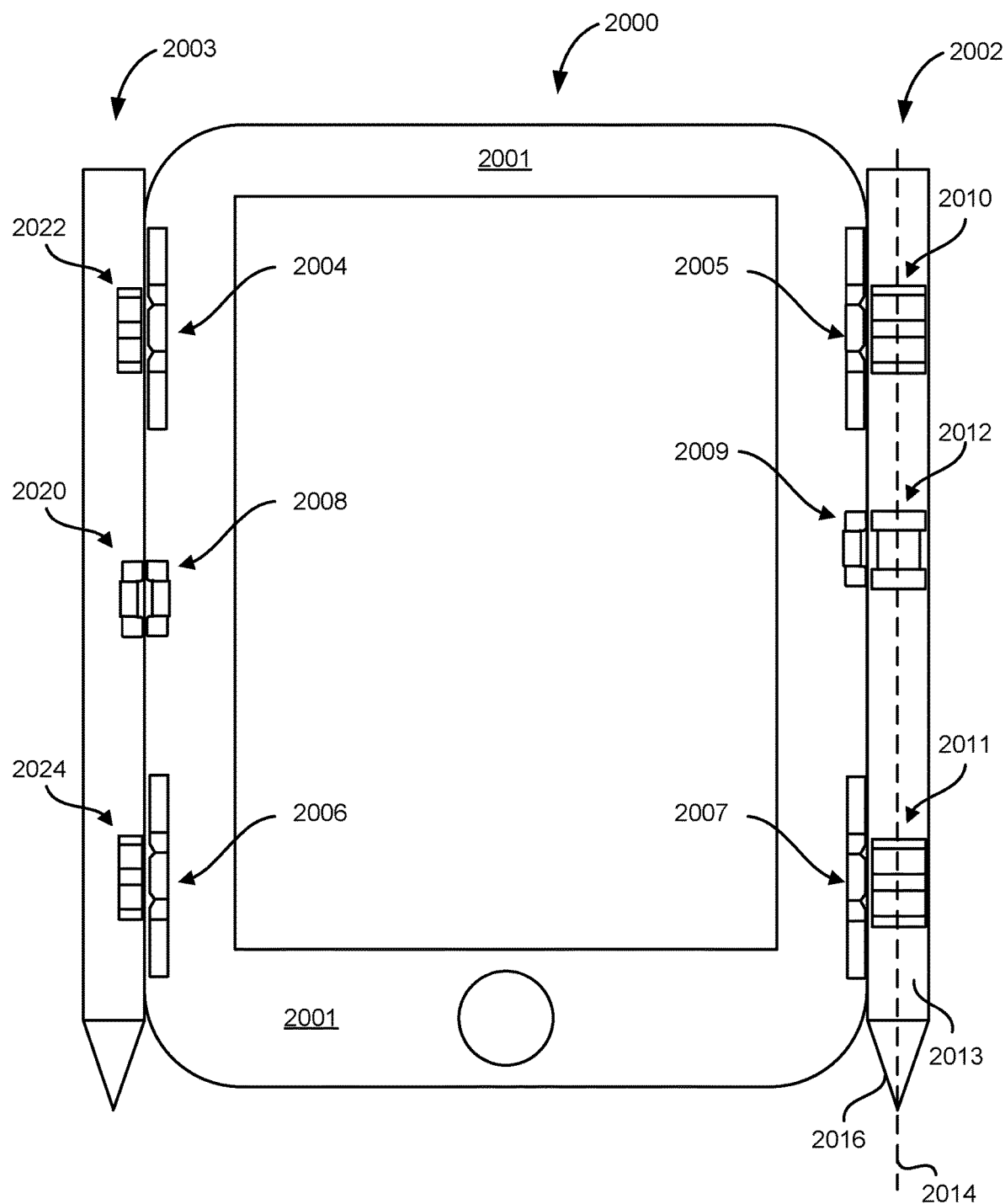
FIG. 20 illustrates an exemplary host device aligned with an exemplary accessory device configured to receive charge at any point along a complete 360° angular rotation, according to some embodiments of the present disclosure.

FIG. 20 illustrates an exemplary wireless charging system where a host device 2000 is aligned with an exemplary accessory device 2002 configured to receive charge at any point along a complete 360° angular rotation, and/or an exemplary accessory device 2003 whose housing includes a flat portion that makes contact with host device 2000, according to some embodiments of the present disclosure. Host device 2000 can include host alignment devices 2004-2007 and transmitting elements 2008-2009. Each host alignment device 2004-2007 can be configured as host alignment device 1600 discussed herein with respect to FIG. 16. Further, each transmitting element 2008-2009 can be configured as transmitting element 200 discussed herein with respect to FIG. 2A. Host alignment devices 2004-2007 and transmitting elements 2008-2009 can be housed within housing 2001 of host device 2000.

As further shown in FIG. 20, accessory device 2002 can include accessory alignment devices 2010-2011 and receiving element 2012. Each accessory alignment device 2010-2011 can be configured as accessory alignment device 1700 discussed herein with respect to FIG. 17A. Further, receiving element 2012 can be configured as receiving element 1300 discussed herein with respect to FIG. 13A. Accessory alignment devices 2010-2011 and receiving element 2020 can be housed within housing 2013 of accessory device 2002. According to some embodiments of the present disclosure, housing 2013 can be axially symmetrical with respect to a central axis 2014 (e.g., substantially cylindrical), and able to receive power from host device 2000 by having its receiving element 2012 interact with time-varying magnetic flux generated by transmitting element 2009. Accessory device 2002 can achieve alignment with host device 2000 to receive power by having its accessory alignment devices 2010 and 2011 interact with respective host alignment devices 2005 and 2007. By being able to align with and receive power from host device 2000 in any degree of angular rotation around central axis 2014, the ease at which accessory device 2002 receives power is substantially improved.

Host device 2000 can additionally or alternatively be configured to wirelessly charge accessory device 2003. Accessory device 2003 can be an accessory device that includes a receiving element 2020 that can receive charge when it is positioned across from a transmitting element as discussed herein with respect to FIGS. 5 and 8A-8B. Thus, receiving element 2020 can be configured as receiving element 400 in FIG. 4 and receiving element 612 in FIGS. 6, 7A-7B, 8A-8B, and 9. In such embodiments, accessory device 2003 can include a housing that has a flat portion that makes contact with host device 2000 to enable wireless power transfer, as discussed herein with respect to FIGS. 6, 7A-7B, and 8A-8B. In addition to receiving element 2020, accessory device 2003 can also include accessory alignment devices 2022 and 2024. Because accessory device 2003 may not be able to receive charge at any point along a complete 360° angular rotation, alignment devices 2022 and 2024 may not need to be configured to be cylindrical, such as alignment devices 2010 and 2011. Instead, accessory alignment devices 2022 and 2024 can be substantially rectangular and can be positioned against one side of accessory device 2003 instead of having to extend around the entire housing, as is necessary for alignment devices 2010 and 2011. Accessory alignment devices 2022 and 2024, however, can still be configured to have the same magnetic structure as alignment devices 2010 and 2011, meaning accessory alignment devices 2022 and 2024 can include a pair of magnets positioned between a center ferromagnetic structure and two side ferromagnetic structures, as discussed herein with respect to FIGS. 17A-17B for magnetically attracting to, and aligning with, respective host alignment devices 2004 and 2006.

Host device 2000 can be any suitable portable electronic device having at least one of a computing system, communication system, sensor system, memory bank, user interface system, battery, and power transmitting circuitry, such as host device 101 discussed herein with respect to FIG. 1. In some embodiments, host device 2000 is a tablet computer, laptop computer, smart phone, or any other suitable device. Additionally, accessory device 2002 can be any suitable electronic device having an operating system, power receiving circuitry, and a battery, such as accessory device 103 in FIG. 1. Accessory device 2002 can be operated to input data into host device 2000. As an example, accessory device 2002 can be a stylus or a smart pencil that a user can use to make contact with host device 101 to input data into host device 101. Accordingly, in some embodiments, accessory device 2002 can include an interfacing end 2016 that is configured to make contact with housing 2001 of host device 2000. For instance, interfacing end 2016 can have a structure that tapers to a tip to mimic the tip of a conventional writing utensil, such as a pencil or pen.

Although FIG. 20 illustrates host device 2000 as having four host alignment devices 2004-2007 and two transmitting elements 2008-2009, embodiment are not so limited. Other embodiments can have more or less host alignment devices and transmitting elements. Furthermore, embodiments are not limited to configurations where host alignment devices 2004-2007 and transmitting elements 2008-2009 are positioned either side of host device 2000. It is to be appreciated that host alignment devices 2004-2007 and transmitting elements 2008-2009 can be positioned in any suitable location that enables power transfer with accessory device 2002, such as a top and/or bottom edges of host device 2000.

In addition to the embodiments discussed above, the following embodiments are also envisioned herein. In particular embodiments, a receiving element can include a ferromagnetic structure axially symmetrical around a central axis disposed along a length of the ferromagnetic structure. The ferromagnetic structure can include a groove region defining two end regions on opposing sides of the groove region, where the groove region has a smaller length than the two end regions. The receiving element can also include an inductor coil wound about the groove region of the ferromagnetic structure and in between the two end regions.

The receiving element, in some cases, can further include a channel disposed along the central axis. The ferromagnetic structure can be in the shape of a cylinder. The end regions can be configured to direct propagation of magnetic flux toward a transmitting element. In some embodiments, the ferromagnetic structure further includes sidewalls that extend a distance equal to or greater than a thickness of the inductor coil. The sidewalls can be positioned between the groove region and the two end regions.

In additional embodiments, an inductive interconnection system includes a transmitting element and a receiving element. The transmitting element can include a transmitting ferromagnetic structure having a transmitting groove region defining two transmitting end regions disposed on opposing sides of the transmitting groove region, where the transmitting groove region has a smaller length than the two transmitting end regions. The transmitting element can also include a transmitting inductor coil wound about the transmitting groove region of the transmitting ferromagnetic structure and in between the two transmitting end regions. The transmitting inductor coil can be configured to generate time-varying magnetic flux through the transmitting ferromagnetic structure. The receiving element can include a receiving ferromagnetic structure axially symmetrical around a central axis disposed along a length of the receiving ferromagnetic structure. The receiving ferromagnetic structure can include a receiving groove region defining two receiving end regions on opposing sides of the receiving groove region, where the receiving groove region has a smaller length than the two receiving end regions. The receiving element can also include a receiving inductor coil wound about the receiving groove region of the receiving ferromagnetic structure and in between the two receiving end regions. The receiving inductor coil can be configured to receive a current induced by the time-varying magnetic flux.

The transmitting end regions can each include respective transmitting interfacing surfaces that face toward the receiving element, where the receiving end regions each include respective receiving interfacing surfaces that face toward the transmitting element. The transmitting interfacing surfaces can face toward at least a portion of the receiving interfacing surfaces. The receiving interfacing surfaces can be axially symmetrical around the central axis. The receiving ferromagnetic structure can further include a channel disposed along the central axis. The receiving ferromagnetic structure can be in the shape of a cylinder.

In some further embodiments, a stylus for inputting data into a host device can include a cylindrical housing, power receiving circuitry disposed within the cylindrical housing, a receiving element disposed within the cylindrical housing and coupled to the power receiving circuitry, and an operating system coupled to the power receiving circuitry and the receiving element, and configured to operate the power receiving circuitry and the receiving element to receive power from the host device. The receiving element can include a ferromagnetic structure axially symmetrical around a central axis disposed along a length of the ferromagnetic structure, the ferromagnetic structure comprising a groove region defining two end regions on opposing sides of the groove region, where the groove region has a smaller length than the two end regions, and an inductor coil wound about the groove region of the ferromagnetic structure and in between the two end regions.

The ferromagnetic structure can further include a channel disposed along the central axis. The ferromagnetic structure can be in the shape of a cylinder. The end regions can be configured to direct propagation of magnetic flux toward a transmitting element. The ferromagnetic structure can further include sidewalls that extend a distance equal to or greater than a thickness of the inductor coil. The sidewalls can be positioned between the groove region and the two end regions. The stylus can further include an interfacing end that is configured to make contact with the host device to input data into the host device. The interfacing end can have a structure that tapers to a tip.

In some embodiments, an alignment device includes a center magnet having poles arranged in a vertical orientation, first and second strengthening magnets disposed on opposite ends of the center magnet, the first and second strengthening magnets having poles arranged in a horizontal orientation, and first and second ferromagnetic structures disposed on outer ends of corresponding first and second strengthening magnets such that the first strengthening magnet is disposed between the first ferromagnetic structure and the center magnet, and the second strengthening magnet is disposed between the second ferromagnetic structure and the center magnet.

The first and second strengthening magnets can be opposite in polarity. The first and second ferromagnetic structures can each have a first width and the center magnet can have a second width less than the first width. The alignment device can further include chamfered regions disposed at interfaces between the center magnet and the first and second strengthening magnets. The chamfered regions can be formed of sloped surfaces in V-shapes where lowest ends of the sloped surfaces are positioned at interfaces between the center magnet and the first and second strengthening magnets. The alignment device can further include outer chamfered edges positioned at outer ends of the alignment device farthest away from the center magnet, where the outer chamfered edges are formed of sloped surfaces sloping downwards away from the center magnet. In some instances, the center magnet can include an interfacing surface having a first polarity, the first strengthening magnet having a second polarity oriented towards the right side, and the second strengthening magnet having a third polarity oriented towards the left side, where the first, second, and third polarities are the same polarity.

In some additional embodiments, an alignment device includes a center ferromagnetic structure; first and second magnets disposed on opposite ends of the center ferromagnetic structure, the first and second magnets having polar ends that are arranged in a horizontal orientation; and first and second side ferromagnetic structures disposed on ends of the first and second magnets such that the first magnet is disposed between the first side ferromagnetic structure and the center ferromagnetic structure, and the second magnet is disposed between the second side ferromagnetic structure and the center ferromagnetic structure.

The first and second magnets can be opposite in polarity. The alignment device can be axially symmetrical around a central axis disposed along a length of the alignment device. The alignment device can further include a channel disposed along the central axis. The alignment device can be substantially cylindrical.

In some further embodiments, a portable electronic device includes a housing, a battery disposed within the housing, a display disposed within the housing and configured to perform user interface functions, a processor disposed within the housing and coupled to the display and configured to command the display to perform the user interface functions, a transmitting element disposed within the housing, and power transmitting circuitry coupled to the processor and the battery, where the power transmitting circuitry is configured to route power from the battery to the transmitting element. The transmitting element can include a center magnet having poles arranged in a vertical orientation, first and second strengthening magnets disposed on opposite ends of the center magnet, the first and second strengthening magnets having poles arranged in a horizontal orientation; and first and second ferromagnetic structures disposed on outer ends of corresponding first and second strengthening magnets such that the first strengthening magnet is disposed between the first ferromagnetic structure and the center magnet, and the second strengthening magnet is disposed between the second ferromagnetic structure and the center magnet.

The first and second strengthening magnets can be opposite in polarity. The first and second ferromagnetic structures can each have a first width and the center magnet can have a second width less than the first width. The transmitting element can further include chamfered regions disposed at interfaces between the center magnet and the first and second strengthening magnets. The chamfered regions can be formed of sloped surfaces in V-shapes where lowest ends of the sloped surfaces are positioned at interfaces between the center magnet and the first and second strengthening magnets. The transmitting element can further include outer chamfered edges positioned at outer ends of the alignment device farthest away from the center magnet, where the outer chamfered edges are formed of sloped surfaces sloping downwards away from the center magnet. In some cases, the center magnet can include an interfacing surface having a first polarity, the first strengthening magnet can have a second polarity oriented towards the right side, and the second strengthening magnet can have a third polarity oriented towards the left side, where the first, second, and third polarities are the same polarity. The portable electronic device can be a tablet.

Although the invention has been described with respect to specific embodiments, it will be appreciated that the invention is intended to cover all modifications and equivalents within the scope of the following claims.

What is claimed is:

1. A stylus for inputting data into a host electronic device, the stylus comprising:
    an elongated housing having first and second opposing ends and a housing wall extending along a length of the housing in between the first and second ends and including a charging region extending along at least a portion of a length of the housing;
    an interfacing end that tapers to a tip and is coupled to the first end of the housing;

a wireless power receiving element disposed within the housing at a location adjacent to the charging region, the wireless power receiving element comprising:
  a shield having a plurality of sidewalls and a back wall extending between the sidewalls to form a cavity;
  a ferromagnetic structure disposed within the cavity and having a groove region extending along a first axis of the ferromagnetic structure between first and second end regions on opposing sides of the groove region, each of the first and second end regions protruding past the groove region in a mirrored relationship with each other along second and third axes, respectively, perpendicular to the first axis, and each of the first and second end regions having an interface surface at its distal end facing the charging region and a back surface opposite the distal end;
  an inductor coil disposed within the cavity and wound about the groove region of the ferromagnetic structure in between the first and second end regions;
  a spacer coupling the ferromagnetic structure to the shield, the spacer including first and second portions disposed between the shield and the back surface of the first and second end regions of the ferromagnetic structure, respectively, wherein the spacer has a thickness that creates a gap between the inductor coil and the shield electrically isolating the inductor coil from the shield.

2. The receiving element of claim 1, wherein the shield comprises four sidewalls coupled to the back wall to form a five-sided box that defines the cavity, and wherein the interface surfaces face toward outside of the cavity.

3. The receiving element of claim 1, wherein the shield includes one or more extensions that extend from one or more sidewalls of the shield in a direction parallel to a plane in which the back wall is oriented.

4. The stylus of claim 1 wherein the first portion and the second portion of the spacer are two separate components.

5. An inductive interconnection system, comprising:
  a first electronic device including a wireless power transmitting element comprising:
    a transmitting ferromagnetic structure having a transmitting groove region defining two transmitting end regions disposed on opposing sides of the transmitting groove region; and
    a transmitting inductor coil wound about the transmitting groove region of the transmitting ferromagnetic structure and in between the two transmitting end regions, the transmitting inductor coil configured to generate time-varying magnetic flux through the transmitting ferromagnetic structure; and
  an electronic stylus including: (i) an elongated housing having first and second opposing ends and a housing wall extending along a length of the housing in between the first and second ends, wherein the housing wall includes opposing interior and exterior surfaces, the interior surface defining a cavity within the housing and the exterior surface defining an outer perimeter of the stylus; (ii) an interfacing end that tapers to a tip and is coupled to the first end of the housing; and (iii) a wireless power receiving element disposed within the housing and comprising:
    a receiving ferromagnetic structure having a groove region defining first and second end regions on opposing sides of the groove region, each end region comprising respective interface surfaces, wherein the groove region has a smaller length than the two end regions;
    a receiving inductor coil wound about the groove region of the ferromagnetic structure and in between the two end regions;
    a shield comprising a plurality of sidewalls and a back wall that form a cavity within which the receiving ferromagnetic structure and receiving inductor coil are positioned; and
    a spacer coupling the receiving ferromagnetic structure to the shield, the spacer including first and second portions disposed between the shield and a back surface of the first and second end regions of the receiving ferromagnetic structure opposite the respective interface surfaces, wherein the spacer has a thickness that creates a gap between the receiving inductor coil and the shield electrically isolating the receiver inductor coil from the shield.

6. The inductive interconnection system of claim 5, wherein the transmitting end regions each include respective transmitting interfacing surfaces that face toward the receiving element, and wherein the transmitting end regions each include respective receiving interfacing surfaces that face toward the transmitting element.

7. The inductive interconnection system of claim 6, wherein the transmitting interfacing surfaces face toward at least a portion of the receiving interfacing surfaces.

8. The inductive interconnection system of claim 6, wherein the transmitting ferromagnetic structure further comprises sidewalls positioned between the groove region and the two end regions that extend a distance equal to or greater than a thickness of the inductor coil.

9. The inductive interconnection system of claim 5, wherein the shield comprises four sidewalls coupled to the back wall to form a five-sided box that defines the cavity.

10. A stylus for inputting data into a host device, the stylus comprising:
  an elongated housing comprising a wall having a flat region extending along at least a portion of a length of the housing;
  power receiving circuitry disposed within the housing;
  a wireless power receiving element disposed within the housing and coupled to the power receiving circuitry, the wireless power receiving element comprising:
    a ferromagnetic structure having a groove region extending between first and second end regions disposed on opposing sides of the groove region, each of the first and second end regions comprising respective interface surfaces spaced apart from and facing the flat region of the elongated housing, wherein the groove region has a smaller length than the two end regions;
    an inductor coil wound about the groove region of the ferromagnetic structure and in between the first and second end regions, wherein the length of the groove region is a dimension that extends along a direction perpendicular to an axis of the inductor coil;
    a shield comprising a plurality of sidewalls and a back wall extending there between, the shield forming a cavity within which the ferromagnetic structure and inductor coil are positioned; and
    a first spacer positioned between the first end of the ferromagnetic structure and the shield to attach the first end of the ferromagnetic structure to the shield and a second spacer positioned between the second end of the ferromagnetic structure and the shield to attach the second end of the ferromagnetic structure to the shield, wherein each of the first and second spacers contacts at least two different surfaces of the ferromagnetic structure and the first and second spacers create a gap between the inductor coil and the shield electrically isolating the inductor coil from the shield; and an operating system coupled to the power receiving circuitry and the receiving element, and configured to operate the power receiving circuitry and the receiving element to receive power from the host device.

11. The stylus of claim 10, wherein each of the first and second spacers is positioned behind a respective interface surface of the first and second end regions of the ferromagnetic structure.

12. The stylus of claim 11, wherein each of the first and second spacers comprises one or more retainers that wrap around parts of the ferromagnetic structure.

13. The stylus of claim 12, wherein the one or more retainers wraps around portions side surfaces of the ferromagnetic structure.

14. The stylus of claim 10, wherein the shield comprises four sidewalls coupled to the back wall to form a five-sided box that defines the cavity.

15. The stylus of claim 10, wherein the end regions are configured to direct propagation of magnetic flux toward a transmitting element.

16. The stylus of claim 10, further comprising an interfacing end that is configured to make contact with the host device to input data into the host device.

17. The stylus of claim 16, wherein the interfacing end has a structure that tapers to a tip.

18. The stylus of claim 10 further comprising a circuit board disposed within the housing an having at least one integrated circuit mounted on the circuit board at a location between the shield and the a portion of the housing wall opposite the flat region.

19. The stylus of claim 10 wherein the flat region of the housing wall includes first and second edges running along a length of the housing and the housing wall further includes a curved region extending along a length of the housing and defining a perimeter of the housing from the first edge of the flat region to the second edge of the flat region.

20. The stylus of claim 10 further comprising a support frame disposed within the housing and extending along at least a portion of the housing length, the support frame having a C-shaped cross-section such that the support frame is positioned against an inner periphery of the curved wall of the housing with an opening of the support frame facing flat region of the wall.

* * * * *

UNITED STATES PATENT AND TRADEMARK OFFICE
CERTIFICATE OF CORRECTION

PATENT NO. : 10,725,515 B2  
APPLICATION NO. : 16/127046  
DATED : July 28, 2020  
INVENTOR(S) : Blake R. Marshall et al.

Page 1 of 1

It is certified that error appears in the above-identified patent and that said Letters Patent is hereby corrected as shown below:

In the Claims

Claim 18, Column 34, Line 7, delete "the housing an having" insert -- the housing and having --

Claim 20, Column 34, Line 22, after "the support frame facing" insert -- the --

Signed and Sealed this
First Day of September, 2020

Andrei Iancu
*Director of the United States Patent and Trademark Office*